United States Patent
Nilsson et al.

(10) Patent No.: US 11,375,812 B2
(45) Date of Patent: Jul. 5, 2022

(54) WALL-MOUNTED, CONFIGURABLE STORAGE SYSTEM

(71) Applicant: Elfa International AB, Vasterik (SE)

(72) Inventors: Peter Nilsson, Vastervik (SE); Lars Ryden, Vastervik (SE)

(73) Assignee: Elfa International AB, Vastervik (SE)

( * ) Notice: Subject to any disclaimer, the term of this patent is extended or adjusted under 35 U.S.C. 154(b) by 28 days.

(21) Appl. No.: 16/569,644

(22) Filed: Sep. 12, 2019

(65) Prior Publication Data

US 2020/0113329 A1    Apr. 16, 2020

Related U.S. Application Data

(60) Provisional application No. 62/730,524, filed on Sep. 12, 2018.

(51) Int. Cl.
| | |
|---|---|
| *A47B 95/00* | (2006.01) |
| *A47B 88/407* | (2017.01) |
| *F16B 2/06* | (2006.01) |
| *A47B 57/34* | (2006.01) |

(52) U.S. Cl.
CPC ............ *A47B 95/008* (2013.01); *A47B 57/34* (2013.01); *A47B 88/407* (2017.01); *F16B 2/065* (2013.01)

(58) Field of Classification Search
CPC ....... A47B 57/40; A47B 57/42; A47B 57/425; A47B 57/50; A47B 57/52; A47B 57/56–567; A47B 95/008; A47B 88/407; A47B 57/34; F16B 2/065
See application file for complete search history.

(56) References Cited

U.S. PATENT DOCUMENTS

| | | | |
|---|---|---|---|
| 2,562,290 A | 7/1951 | Dickerson | |
| 2,644,591 A | 7/1953 | McMahan | |
| 2,661,993 A | 12/1953 | Little | |
| 2,919,033 A | 12/1959 | Harald | |
| 2,921,693 A * | 1/1960 | McLean | A47B 57/425 52/40 |
| 3,278,248 A | 10/1966 | Tibor | |

(Continued)

FOREIGN PATENT DOCUMENTS

| | | |
|---|---|---|
| CA | 2737714 A1 | 10/2012 |
| CN | 2648906 Y | 10/2004 |

(Continued)

OTHER PUBLICATIONS

International Search Report issued in corresponding Application No. PCT/US2018/050781, dated Feb. 14, 2019.

(Continued)

*Primary Examiner* — Matthew W Ing
(74) *Attorney, Agent, or Firm* — Hubbard Law, PLLC

(57) ABSTRACT

In a wall-mounted shelving and/or storage system, vertical standards are mounted to a wall using a plurality of individual cleats arranged in vertical columns and horizontal rows. The width of each cleat is smaller than the width of the standard, so that it can be hidden within the standard when mounted. Formed on the back of each vertical standard are a plurality of transverse edges at predefined intervals, in known spatial relationships with bracket connection points, for cooperating with the cleats to properly position and orient the standards at the correct height with respect to each other.

25 Claims, 30 Drawing Sheets

(56) References Cited

U.S. PATENT DOCUMENTS

| | | |
|---|---|---|
| 3,325,129 A | 6/1967 | Tinfow |
| 3,331,514 A | 7/1967 | Bruynzeel |
| 3,563,182 A | 2/1971 | Macfarlane |
| 3,592,493 A | 7/1971 | Goose |
| 3,601,347 A | 8/1971 | Attwood |
| 3,645,486 A | 2/1972 | Ferdinand |
| 3,671,061 A | 6/1972 | Dawdy |
| 3,765,344 A | 10/1973 | Ferdinand |
| 3,771,466 A | 11/1973 | Ferdinand et al. |
| D230,116 S | 1/1974 | Beams |
| 3,828,937 A | 8/1974 | Nash |
| 3,848,844 A | 11/1974 | Barrett |
| 3,865,336 A | 2/1975 | Robertson |
| 3,993,002 A * | 11/1976 | Stroh ............... A47F 5/13 108/108 |
| 4,069,638 A | 1/1978 | Hasselqvist et al. |
| 4,285,484 A | 8/1981 | Follows |
| 4,312,086 A | 1/1982 | Bianco |
| 4,411,400 A | 10/1983 | Everett |
| 4,711,420 A | 12/1987 | Cowler |
| 4,735,470 A | 4/1988 | Falk |
| 4,816,205 A | 3/1989 | Gallix |
| 4,944,566 A | 7/1990 | Carper |
| 5,004,198 A | 4/1991 | Jager |
| 5,004,201 A | 4/1991 | Bessinger |
| 5,007,608 A | 4/1991 | Carroll, Jr. |
| 5,014,902 A | 5/1991 | Heimendinger |
| 5,074,009 A | 12/1991 | Simonton et al. |
| 5,110,080 A | 5/1992 | Rieman |
| D327,839 S | 7/1992 | Stumpf |
| 5,348,385 A | 9/1994 | Berg |
| 5,377,851 A | 1/1995 | Asano |
| 5,472,103 A * | 12/1995 | Meri ............... A47B 47/022 211/187 |
| 5,509,541 A * | 4/1996 | Meri ............... A47B 45/00 211/103 |
| 5,531,416 A | 7/1996 | Remmers |
| 5,551,772 A | 9/1996 | Keffer |
| D411,738 S | 6/1999 | Raasch |
| 6,185,887 B1 | 2/2001 | Strassle |
| 6,195,953 B1 | 3/2001 | Gitter et al. |
| 6,428,128 B1 | 8/2002 | Henriott et al. |
| 6,497,185 B1 | 12/2002 | Barrett et al. |
| 6,592,194 B2 | 7/2003 | Lininger et al. |
| D479,932 S | 9/2003 | Clucas |
| D529,254 S | 9/2006 | Huguet |
| D557,526 S | 12/2007 | Littorin |
| D572,125 S | 7/2008 | Nilsson |
| D577,936 S | 10/2008 | Held |
| D592,945 S | 5/2009 | Mahan |
| D649,026 S | 11/2011 | Kong |
| D649,027 S | 11/2011 | Pensi |
| D674,626 S | 1/2013 | Gasser |
| D680,361 S | 4/2013 | Zobel et al. |
| D684,402 S | 6/2013 | Gasser |
| D684,403 S | 6/2013 | Gasser |
| D722,831 S | 2/2015 | Tuang et al. |
| D732,864 S | 6/2015 | Clouse et al. |
| D732,941 S | 6/2015 | Erickson |
| D733,431 S | 7/2015 | Kokenge |
| 9,130,326 B2 | 9/2015 | Meis |
| 9,131,771 B2 | 9/2015 | Lindblom |
| D761,236 S | 7/2016 | Wengreen |
| D766,634 S | 9/2016 | Nilsson et al. |
| 9,476,441 B2 | 10/2016 | Strassle et al. |
| D770,206 S | 11/2016 | Nilsson et al. |
| D784,745 S | 4/2017 | Nilsson et al. |
| D785,605 S | 5/2017 | Hochman et al. |
| D789,718 S | 6/2017 | Gokhale et al. |
| 9,743,762 B1 | 8/2017 | Beuses |
| D800,185 S | 10/2017 | Onrat |
| D801,094 S | 10/2017 | Verna |
| D808,697 S | 1/2018 | Heckler |
| D809,672 S | 2/2018 | Brennan et al. |
| 10,012,255 B2 | 7/2018 | Knutson et al. |
| 10,016,057 B1 * | 7/2018 | Arnautovic ............ A47B 88/43 |
| D828,744 S | 9/2018 | Bright |
| D839,029 S | 1/2019 | Nilsson |
| D843,149 S | 3/2019 | Nilsson |
| D869,195 S | 12/2019 | Nilsson |
| D882,290 S | 4/2020 | Nilsson |
| D927,292 S | 8/2021 | Zussman |
| 11,229,287 B2 | 1/2022 | Nilsson |
| 2002/0043914 A1 | 4/2002 | Munday et al. |
| 2005/0006541 A1 | 1/2005 | Magnusson |
| 2005/0011844 A1 | 1/2005 | Magnusson |
| 2005/0056604 A1 * | 3/2005 | Chen ............... A47B 57/40 211/182 |
| 2005/0160691 A1 | 7/2005 | Kim |
| 2007/0221597 A1 | 9/2007 | Chen |
| 2008/0116329 A1 | 5/2008 | Magnusson |
| 2008/0142669 A1 * | 6/2008 | Zlotocha ............... A47G 1/16 248/478 |
| 2008/0173778 A1 | 7/2008 | Mertens |
| 2009/0139943 A1 | 6/2009 | Fernandez |
| 2009/0242497 A1 | 10/2009 | Nilsson |
| 2010/0001159 A1 * | 1/2010 | Kao ............... B25H 3/04 248/316.4 |
| 2010/0300999 A1 | 12/2010 | Schwartzkopf |
| 2011/0042333 A1 | 2/2011 | Magnusson |
| 2011/0219706 A1 | 9/2011 | Bates |
| 2013/0199099 A1 | 8/2013 | Lars |
| 2014/0138332 A1 | 5/2014 | Loree |
| 2015/0076983 A1 | 3/2015 | Lindblom |
| 2015/0152904 A1 | 6/2015 | Nilsson |
| 2015/0296982 A1 | 10/2015 | Chen et al. |
| 2016/0227944 A1 * | 8/2016 | Gonzalez ............ A47F 5/0892 |
| 2016/0316939 A1 | 11/2016 | Kraiss |
| 2017/0112282 A1 | 4/2017 | Will |
| 2017/0119150 A1 | 5/2017 | Andersson |
| 2017/0311717 A1 | 11/2017 | Nilsson |
| 2018/0132610 A1 * | 5/2018 | Lu ............... A47B 57/42 |
| 2018/0135796 A1 | 5/2018 | Lu |
| 2019/0387902 A1 * | 12/2019 | Peck ............... A47B 57/16 |
| 2020/0113329 A1 | 4/2020 | Nilsson |
| 2020/0187675 A1 | 6/2020 | Obitts |
| 2020/0288866 A1 | 9/2020 | Richard |

FOREIGN PATENT DOCUMENTS

| | | |
|---|---|---|
| CN | 201782324 U | 4/2011 |
| CN | 203572135 U | 4/2014 |
| CN | 102113777 B | 5/2014 |
| CN | 104145535 A | 11/2014 |
| CN | 203934885 U | 11/2014 |
| CN | 205813984 | 12/2016 |
| CN | 207621131 | 7/2018 |
| DE | 10020772 C1 | 1/2002 |
| EP | 1656049 A1 | 5/2006 |
| EP | 2090197 A1 | 8/2009 |
| EP | 2372064 A1 | 10/2011 |
| ES | 233096 U | 3/1978 |
| GB | 803789 A | 10/1958 |
| GB | 1503214 A | 3/1978 |
| GB | 2169791 | 7/1986 |
| GB | 2284745 | 6/1995 |
| JP | H0965957 A | 3/1997 |
| JP | 2002051852 A | 2/2002 |
| JP | 2010269078 | 12/2010 |
| RU | 2082307 C1 | 6/1997 |
| RU | 8571 U1 | 12/1998 |
| RU | 30249 U1 | 6/2003 |
| RU | 80099 U1 | 1/2009 |
| RU | 2014123979 A | 12/2015 |
| RU | 2579735 C2 | 4/2016 |
| SE | 504960 C2 | 6/1997 |
| WO | 9424440 | 10/1994 |
| WO | 9427474 A1 | 12/1994 |
| WO | 2008060221 A2 | 5/2008 |
| WO | 2013071977 A1 | 5/2013 |
| WO | 2013191624 A1 | 12/2013 |
| WO | 2015189142 A1 | 12/2015 |
| WO | 2016077717 A1 | 5/2016 |
| WO | 2016176915 A1 | 11/2016 |

(56) References Cited

FOREIGN PATENT DOCUMENTS

| WO | 2019083632 A1 | 5/2019 |
| WO | 2021061683 A1 | 4/2021 |
| WO | 2021133240 A1 | 7/2021 |

OTHER PUBLICATIONS

International Search Report issued in corresponding Application No. PCT/US2018/058598, dated May 30, 2019.
Written Opinion issued in corresponding Application No. PCT/US2018/050781, dated Feb. 14, 2019.
Written Opinion issued in corresponding Application No. PCT/US2018/058598, dated May 30, 2019.
International Search Report and Written Opinion received in Patent Cooperation Treaty Application No. PCT/US2018/050781, dated Feb. 14, 2019. (15 pages).
Extended European Search Report issued in corresponding European Application No. 18870845.7, dated Jul. 5, 2021.
Final Office Action issued in corresponding U.S. Appl. No. 16/759,727, dated Aug. 18, 2021.
First Office Action issued in corresponding Chinese Application No. CN201880020114.9, dated Jan. 19, 2021.
International Search Report and Written Opinion for International Patent Application PCT/SE2021/050395 dated May 14, 2021.
International Search Report and Written Opinion from PCT/SE2021/050396 dated May 19, 2021.
Search report from SE 2050497-3 dated Nov. 25, 2020.
Elfa Creating Space, Product List 2019/20 Interior, 940983, Ver. 1, Jan. 2020, 84 pages.
Elfa, Product List, Ver. 1, Oct. 2016, 32 pages.
Office Action (Non-Final Rejection) dated Mar. 15, 2022 for U.S. Appl. No. 17/276,109 (pp. 1-5).
Office Action (Non-Final Rejection) dated Apr. 12, 2022 for U.S. Appl. No. 16/759,727 (pp. 1-7).
RU Application No. 2020116366/03(026753) Decision on Granting a Patent For Invention dated Nov. 19, 2021.

* cited by examiner

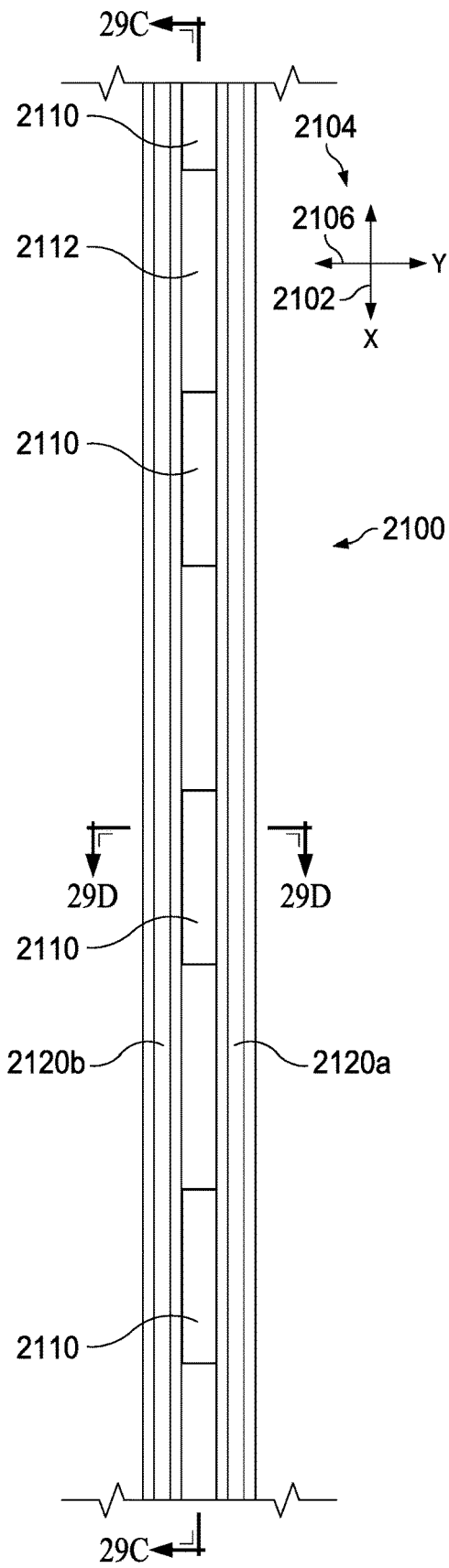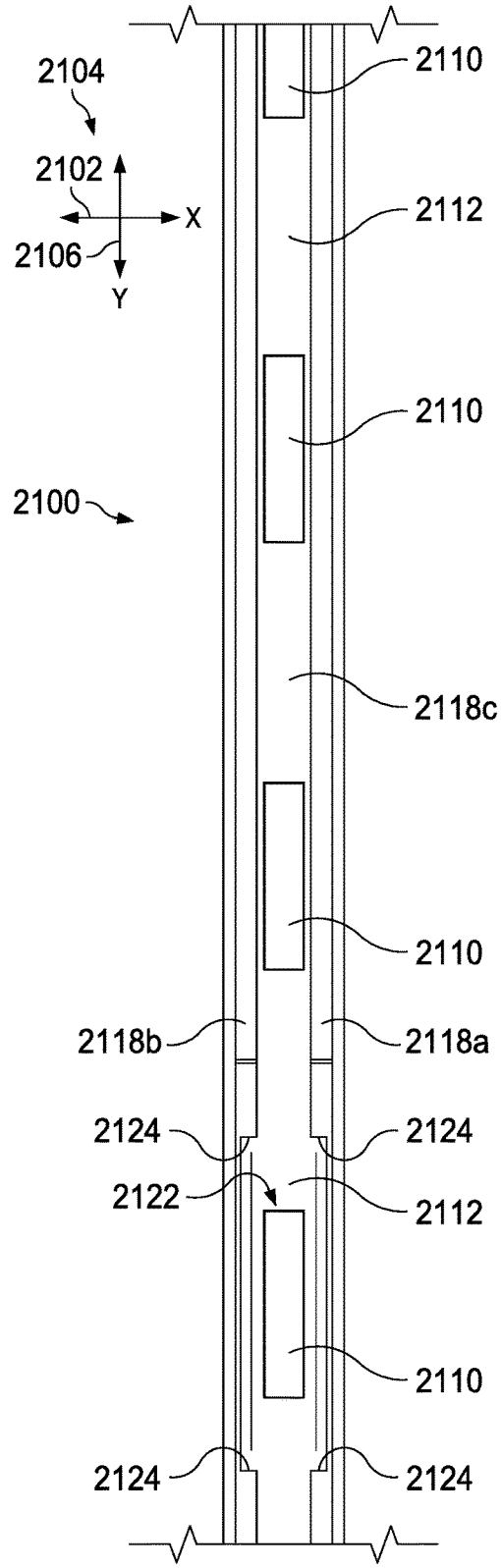
FIG. 29A
FIG. 29B

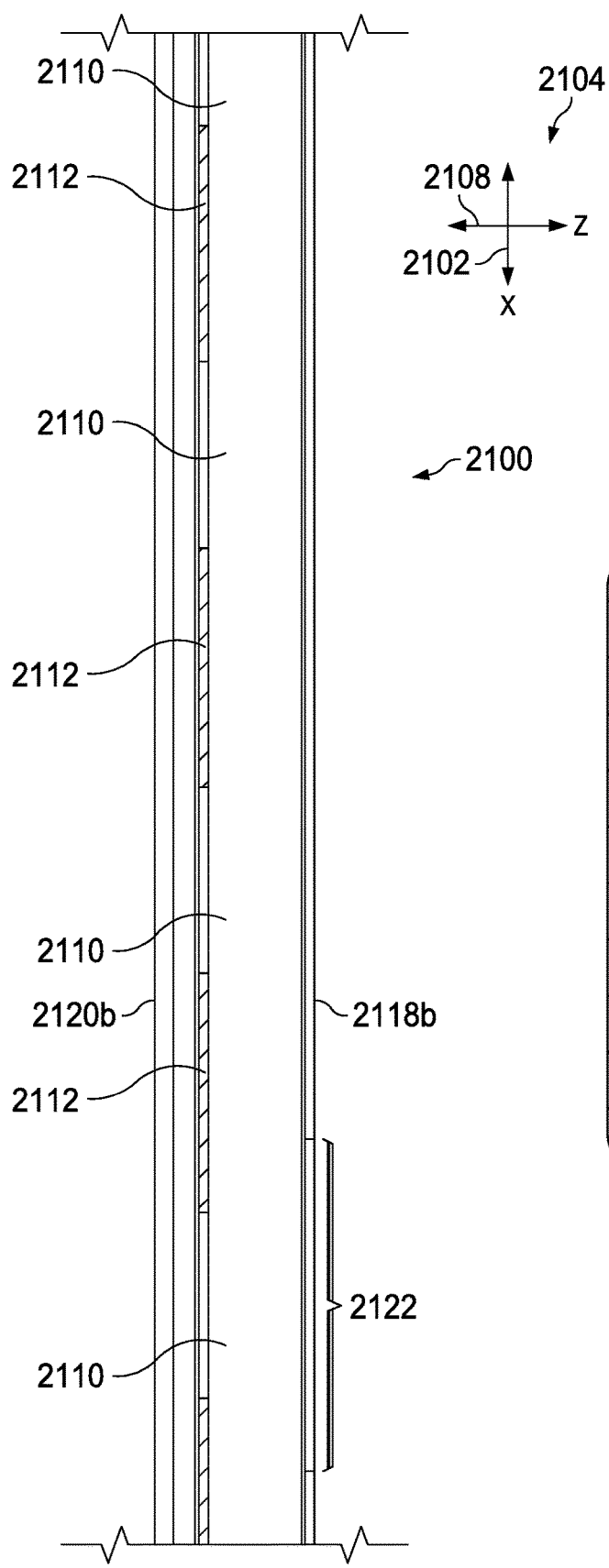
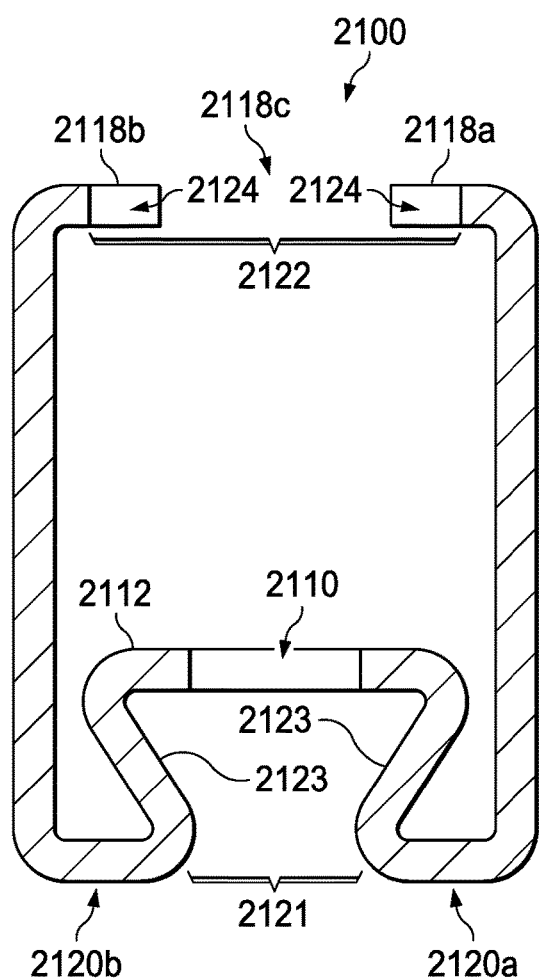
FIG. 29C
FIG. 29D

WALL-MOUNTED, CONFIGURABLE STORAGE SYSTEM

RELATED APPLICATION

This application claims the benefit of U.S. provisional application 62/730,524, filed Sep. 12, 2018, which is incorporated by reference herein for all purposes.

FILED OF THE INVENTION

The present disclosure relates to wall-mounted, configurable storage systems.

BACKGROUND

Conventional configurable and modular wall-mounted storage systems typically comprise at least two vertical standards for mounting to a vertical a predetermined distance apart, and at least one cantilevered bracket attached to each standard. Such storage systems also include, at least one type of cantilevered bracket for attaching to the vertical standards one or more other components, such as shelves, baskets, sliding drawers, and any other types of component for storing, organizing and displaying clothing, clothing accessories, books, papers, files, equipment, and decorative and useful objects, from which an end user can choose to design and install a combination of components that meets the user's needs and fits within the available space. Such systems can also be used to create desks, work surfaces, seating, and other furniture-like arrangements, depending on components and accessories that are available, and the strength of the wall, the components of the storage system, and the connection between components of the storage system and the wall.

Each standard has a plurality of slots to which the brackets can be attached. A cantilevered bracket is attached to a standard by inserting one or more hooks located on one end of the bracket, into slots formed in the standard. A hook can be formed in any number of ways, but in one example it is formed using a tab having a notch in a bottom edge of the tab, into which a bottom edge of a slot slides when the tab is inserted into the slot and pushed down.

One such, commercially available wall-mounted shelving and storage system is sold by Elfa International. The vertical standards can be mounted to a wall in different ways. The standards can be directly mounted to the wall using screws inserted through holes spaced at intervals along the standard. The standards may also be mounted to a wall with a separate clip with a tab at one end that can be attached to the wall with the screw, and a tab at an opposite end that can be inserted into one of the slots on the bracket.

Another method for mounting standards is to hang multiple, spaced-apart vertical standards from single, horizontal track that is attached the wall with fasteners such as screws. A bottom edge of the track is bent to form an upturned edge that acts like hook. The top of each standard has formed in it an angled slot that receives the upturned edge and holds the standard in a steady position on the track. One advantage of this type of horizontal track is that it is simple to install. Only one track needs to be leveled and screwed into the wall. The standards may also be hung at any point along the track, and easily shifted laterally to achieve the correct spacing between them, all while maintaining parallel alignment and correct horizontal positioning so that the slots in the standards hung from the same track are horizontally aligned and evenly spaced apart along the entire lengths of the standards.

In contrast, attaching multiple standards to the wall using screws or clips requires careful placement so that the standards are parallel and the bracket slots on the standards are aligned horizontally.

SUMMARY

The following specification discloses embodiments of various aspects a wall-mounted storage systems, each of which individually or in combination other aspects, may be used to solve one or more problems or disadvantages of prior wall mounted storage system, or provide other or additional advantages.

One aspect of a wall-mounted shelving and/or storage system disclosed below relates to standards for mounting vertical standards to a wall using individual cleats. Formed on the back of each vertical standard is at least one, and in other embodiments, a plurality of transverse edges having preselected, set spatial relationships with bracket connection points on the standard. At least one transverse edge is adapted for cooperating with a cleat connected to the wall. The transverse edge comprises a mounting point on the standard and acts as a means for stopping the standard from sliding downwardly when attached to the wall.

Use of individual cleats in a wall mounted storage system, as compared to a horizontal track, can address one or more problems. For example, when using a single, horizontal track, all of the standards must hang from it, and thus the horizontal track must be placed high enough to accommodate the longest standard that will be used for a particular installation. Although many satisfactory arrangements of wall-mounted shelving and storage systems can be constructed with this method of mounting, others are not possible. Individual cleats also may facilitate installation, as compared to screws, clips and other fasteners used in previous systems. In previous systems, the standard must be held in placed while the fastener is connected to the walls. A slippage or misalignment will result in improper positioning of the standard with respect to the other standards. Attaching cleats at measured locations on the wall allow standards to be quickly mounted by simply aligning the standard over column of cleats, so that the cleats fit into openings formed in the back of the standard, and the standard then lowered to have its transverse edges catch the cleats. The cleats are fastened to a wall. In one example, each is are fastened to a wall using a screw. In another example each is fastened to one of two or more rails that are mounted horizontally to the wall, the horizontal rails having been fastened to the wall. The use of horizontal rails ensures placement of cleats in rows and allows for easy adjustment of position of the cleat on the rail to form a column of two or more cleats on which to hang a standard vertically with multiple support points for transferring the loads from the storage components and their contents to the wall.

In embodiments in which a standard intended for vertical mounting has a plurality of mounting points in a known spatial relationship to each other—for example, they are spaced apart along the length of the standard by a predetermined interval, or at standardized intervals—the standard is capable of being mounted on a wall using multiple cleats connected to the wall in a column at locations known to correspond to the mounting points. Providing for the use of regularly spaced cleats to attach or mount the standard to the wall reduces the opportunity for the standard to bend when heavily loaded, as compared to, for example, when a standard is hung on a wall at a single point, such as when a horizontal track is used to hang the standard.

According to different aspect of the wall mounted storage systems disclosed below, a cleat used to retain a vertical standard on a wall has a width smaller than the width of the standard, so that the entire can fit inside the standard when mounted, which allows it to be at least partially hidden from view.

Another aspect of the wall-mounted shelving systems disclosed below involves processes for installing a wall-mounted storage system comprising multiple standards having transverse edges formed at known positions along the back of the standard—for example, at regular intervals along the length of the standard, as measured from one end of the standards used in the system. The process comprises arranging cleats in columns and rows to form a grid pattern that at least corresponds to, or is as large as necessary to accommodate, a desired layout of standards for a particular installation, without any requirement that the standards be placed against the wall to layout the cleats. The cleats in columns are arranged at predetermined intervals corresponding to predetermined positions of mounting points on the back of a standards that will be vertically mounted on the wall with the cleats. The cleats in a row are spaced apart by a distance equal to one of one or more standard widths of components. When cleats are laid out this grid-like fashion, the vertical standards are able to be mounted quickly in a manner that assures proper alignment of each of the standards.

According to another aspect of the wall-mounted shelving systems disclosed below, a representative example of a standard for mounting vertically, to which cantilevered brackets and the like can be connected to support storage and components of the system, is elongated along a central axis and narrow, relative to its length along the central axis, along two other axes that are mutually orthogonal to the central axis and each other. The standard comprises a front side, on which is formed a plurality of bracket connection points arranged along its length for connecting said cantilevered brackets to the standard, wherein the plurality of bracket connection points comprise one or more columns of slots formed in a front wall of the standard spaced at predetermined intervals, and there is provided, on opposite sides of the at least one column of slots raised portions partially obscuring the at least one column of slots and defining a groove in front of the at least one column of slots with an opening, through which an end of a bracket may be inserted for connection with the slots. The slot column is thus partially hidden, and this effect is provided regardless of how the standard is attached to the wall.

In yet another aspect of the disclosed systems, an embodiment of a cleat for connecting a vertical standard to a horizontal rail in a storage system comprises an upper recess, indentation, or slot for taking up an edge of the vertical standard and a rear cut-out configured to clasp a portion of the wall-mounted rail, and a movable tongue which is configured to be moved to interfere with the upper recess and the rear cut-out, thereby locking vertical standard to the wall-mounted rail. One advantage to this example is that the interface of the vertical standard and the cleat, and the interface of the cleat and the horizontal rail, a locked or clamped in the same operation. In a representative example of a such a cleat, the tongue is moved by a screw that is connected to a front wall of the cleat by a swivel and has a threaded connection with the tongue. The screw's head can be reached by a tool extending through one of the slots in the vertical standard to which brackets are attached. The threads can be made left-handed. Furthermore, in other examples, a slot can be formed in the front wall of the cleat, under the screw head, to accommodate a connecting portion of a bracket to be inserted through the slot in the standard.

In a representative example of a configurable storage system, a cleat comprises an upper recess for taking up a transverse edge on the backside of the standard to hang the standard on the cleat) and a screw for securing the standard to the cleat. The standard has vertically oriented slots on its front side for receiving connecting portions of brackets. The locations of the screw and the upper recess on the cleat on the one hand and the transverse edge of the standard and one of the slots on the front of the standard on the other hand are fixed and related such that the head of the screw is located at one end of one of the slots when the transverse edge of the standard is placed in the upper recess of the cleat, thereby ensuring that the screw can be seen and is accessible by a tool through the slot. Ensuring that the screw is located at one of the slot also ensures sufficient room to accommodate a connecting portion of bracket that extends through the slot.

Although there are advantages to using the foregoing aspects in combination, these and other aspects and embodiments of wall-mounted storage systems described below by themselves in other wall mounted storage systems to solve similar problems.

These and other improvements to wall-mounted storage systems are described below in reference to representative examples of embodiments of wall-mounted storage systems.

BRIEF DESCRIPTION OF THE DRAWINGS

FIG. 29A is a front view of a vertical standard.

FIG. 29B is it a view of a backside of the vertical standard of FIG. 29 *a*.

FIG. 29C is a cross-section of the vertical standard of FIG. 29A taken long section line 29C-29C.

FIG. 29D is a cross-section of the vertical standard shown in FIG. 29A taken a long section line 29D-29D.

FIG. 31 A shows cleats being installed on the horizontal rails attached to the wall as shown in FIG. 21; FIG. 31B shows the hanging of vertical standards on the cleats; FIG. 31C shows the installation after the vertical rails have been hung; FIG. 31D shows insertion of a tool through a front groove and slot of one of the vertical standards to move the clamp; and FIG. 31E shows the tool being turned to tighten the clamp.

FIG. 32 is a top, front perspective view of the bracket of FIG. 32 mounted on the vertical standard shown in FIGS. 29A-D.

DETAILED DESCRIPTION

In the following description like numerals refer to like elements.

Figure 1:
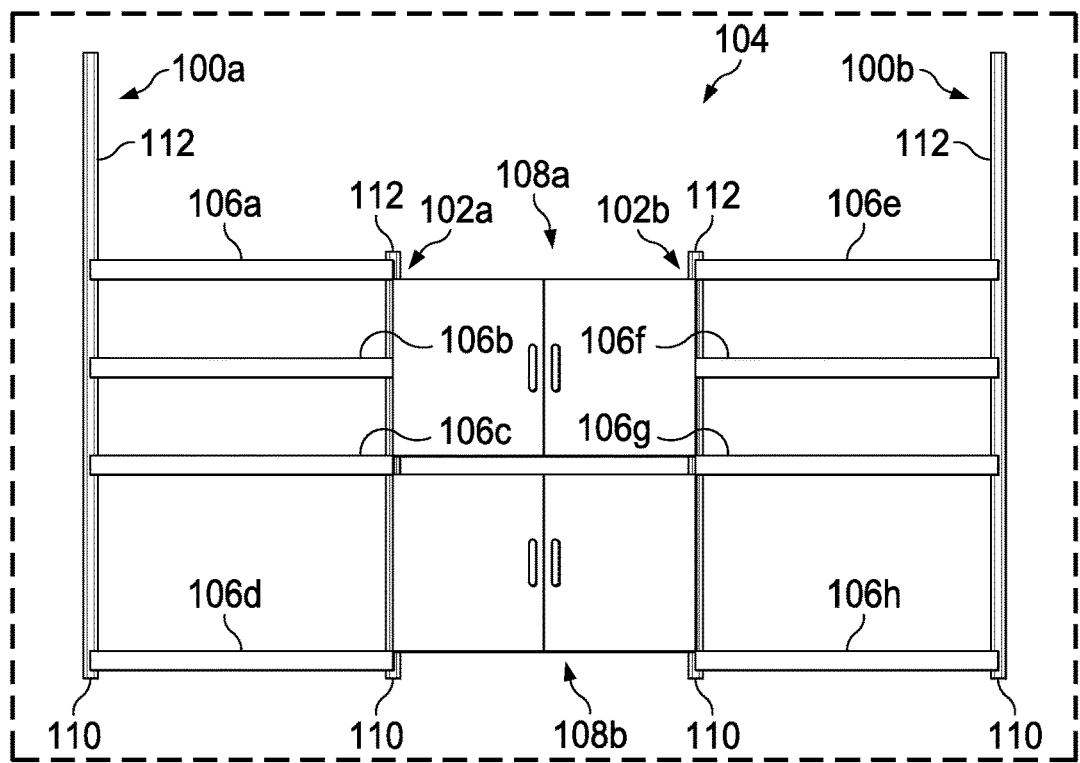
FIG. 1 is a front, elevational view of an installation of a first exemplary configuration of a wall mounted storage system.
Figure 2:
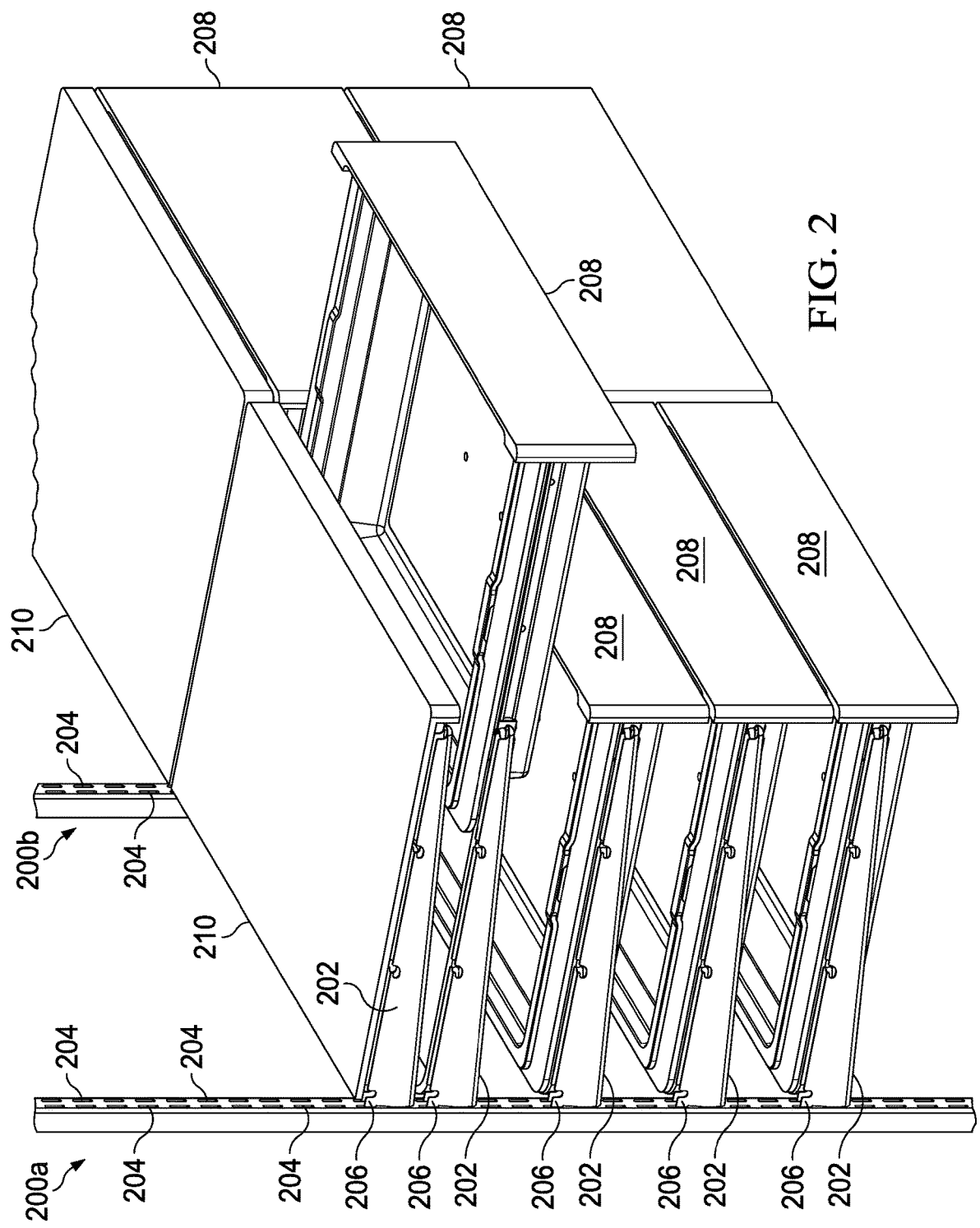
FIG. 2 is a perspective view of an installation of a second, exemplary configuration of a wall mounted storage system.

FIGS. 1 and 2 are non-limiting examples of installations of a representative embodiment of a wall-mounted storage system comprising standardized components. Standardized components are components with standardized dimensions, from which to assemble and mount on a vertical wall a storage system with any number of possible different configurations and sizes, depending on the storage preferences and objectives of the installer and available space. The following description will reference this example installation and storage system. However, the subject matter described below is not limited to the particular configuration of the example installation or embodiment of wall mounted storage system that is shown.

The basic components of a wall-mounted storage system, such as the embodiment shown in the examples illustrated in FIGS. 1 and 2, typically comprise standards for mounting vertically on a vertical wall, and cantilevered brackets for connecting to the vertical standards.

The size of each standard is relatively long in one dimension, and relatively narrow or short in each of the other two dimensions. The relatively long dimension will be referred to its length, measured from a bottom end to a top end when it is installed vertically on a vertical wall, in the manner shown in FIGS. 1 and 2. Each of its other two, dimensions will be referred to as its width, measured from one side of the standard to the other when mounted vertically on wall, and depth, measured from its front, to which the brackets are attached, to its back, which touches the wall when it is mounted on the wall.

Each of the standards will usually have on its front regularly spaced slots, into which hooks or tabs located on the end of the brackets are inserted, to allow the brackets to be mounted or connected to the standard at a plurality of different positions to allow for adjustability and/or different configurations. A bracket can usually be disconnected and attached to a different position on the standards. The depth of the standard needs to be sufficient to accommodate at least the hooks or tabs of the brackets when they are inserted into the slots.

Wall mounted storage systems typically include at least a shelf that can extend between, and be supported by, two cantilevered brackets installed at the same height or level on adjacent, spaced-part standards. However, such systems may include many more types of components and accessories that can be connected to the standards or otherwise supported by the brackets connected to the standards. Once the standards are mounted to a wall, such systems usually, but need not, allow reconfiguration of the components, and the addition of new components. Non-limiting examples of components include shelves, drawers, cabinets, baskets, racks, and hooks.

The example of FIG. 1 includes a plurality of standards 100a, 100b, 102a and 102b, mounted to a vertical wall 104 in a home or business. Each of the standards include, in this example, a plurality of predefined connection points or positions. In one embodiment, the connection points for each standard are located at the same position along each of the standard, so that the standards are interchangeable. The predefined connection points may be regularly spaced apart along the length of each standard to provide adjustability and more configuration options. However, the same interval need not be used along the entire length of the standard. It could be varied, though it is preferred, but not necessary, that at least some (two or more, for example) of the connection points on each of the plurality of standards align to ensure that components are level when attached.

The supporting cantilevered brackets connected to the standards are, in this view, obscured by the components mounted on them. However, there are brackets connected to each of the plurality of standards to support opposite ends of shelves 106a, 106b, 106c, 106d, 106e, 106f, 106g, and 106h. The brackets are also used to support, in this particular example installation, cabinet assemblies 108a and 108b.

Standards 100a and 100b are, in this example longer than standards 102a and 102b. In other examples, the standards could be the same length, or each a different length. Bottom ends 110 of the standards are aligned horizontally is this example, and top ends 112 are not. However, the top ends could be aligned in other configurations. Furthermore, neither the top nor bottom ends need to be aligned, as long as the predefined connection points or positions, to which brackets used to support a component are attached, are at the same distance above the floor. In other words, each of the plurality of standards could be cut or made to different lengths but installed or mounted on wall with connection points aligned.

The installation shown in FIG. 2 includes standards 200a and 200b mounted on a vertical wall. Brackets 202 are attached to the standards. These same brackets are used in the example of FIG. 1. However, the subject matter described herein could also be used, if desired, with different types of brackets.

Each standard includes at least one column of slots into which one or more hooks and, optionally, stabilizing tabs disposed on the end of a bracket can be inserted to support the bracket in a cantilevered fashion on the standard. In the embodiment of the wall-mounted storage system used for the example installations of FIGS. 1 and 2, each of the standards 100a, 100b, 102a, 102b, 200a, and 200b includes a plurality of pairs of slots 204 spaced apart at a regular interval along the length standard to establish a plurality of connection points. Each pair of slots are arranged in side-by-side pairs to receive a pair of side-by-side hooks 206 (formed by notched tabs) extending from the end of bracket, where it connects to the standard, for inserting into a pair of slots. As compared to brackets that use a single hook, brackets using a pair of side-by-side hooks are more laterally stable and tend not to swing from side to side. However, in alternative embodiments, a bracket with a single hook, or even more than two hooks, could be used. In this particular example, the pairs are spaced from each other at a 32 mm interval, measured from the center of a slot to the center of each slot immediately above and below it. However, other spacing or intervals could be used, including embodiments. The invention is not limited to specific spacing.

In the exemplary installation of FIG. 2, the wall-mounted storage system installation includes, as examples of different types, components of several types of drawers 208 of different depths and shelves 210. The drawers move between an extended (open) position and a retracted (closed) position. Each of the drawers are mounted and supported between pairs of brackets.

Figure 3:
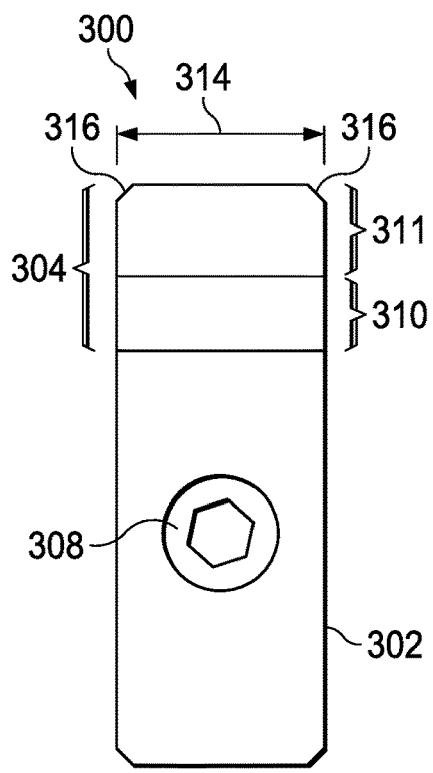
FIG. 3 is a front view of a cleat for mounting vertical standards in a wall mounted storage system.
Figure 4:
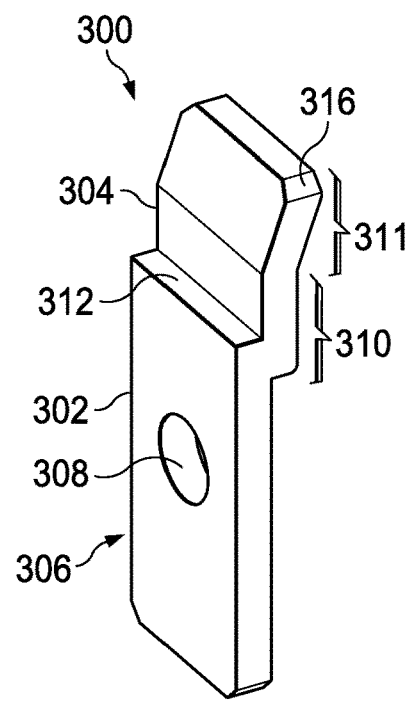
FIG. 4 is a perspective view of the cleat of FIG. 3.

Referring now to FIGS. 3 and 4, illustrated is a representative example of one embodiment of a cleat 300 for mounting vertical standards of a wall-mounted storage system to a wall. As explained below, at least one cleat is attached to a wall, and preferably at least two cleats are attached in vertical column, with a spacing corresponding to at least two mounting points on the back of the standard that have the same spacing.

The cleat comprises a portion that forms a base 302 that is placed against the wall and a projection that extends upwardly from the cleat, and a portion that forms projection 304 that cooperates with the mounting point on the back of a standard. The mounting point includes at least one transverse extending edge that rests on top of the cleat when the standard is mounted to the wall to prevent it from sliding down the wall, and an inward facing surface that cooperates with the projection to position the standard against the wall.

In the illustrated example, base 302 comprises a rear, flat surface 306 that is intended to sit against the wall. The flat back surface enables the cleat to be attached to a wall using a screw, gypsum anchor, drywall screw or similar fastener (not shown) inserted through screw hole 308 without excessive rocking or movement. However, alternative embodiments that do not have a flat, rear surface can be used. If stability is desired, such alternative embodiments may provide stability using, for example, multiple contact points or surfaces for engaging the wall. Although it is not required, providing a single attachment point to the wall, such as screw hole 308, as opposed to using multiple fasteners or a fastener whose position relative to the cleat is not fixed, has an advantage of helping to assure that a cleat is attached to a wall at a correct location relative to other cleats being used to mount the same standard and one or more other standards on the same wall. It reduces the opportunity for error during installation and thus helps an installer to ensure that the standard is vertical and properly spaced from adjacent standards when hung, with its bracket connection points (the slots, for example) properly aligned with the bracket connection points on other, adjacent standards to ensure level installation of components.

Although a screw is one method of attaching the cleat, other types of means for fastening or attaching the cleat to the wall could be used, though possibly sacrificing the advantages of a screw or at the cost of added complexity. Examples of fasteners include nails, adhesives, hook and loop, clips, clamps, bolts, straps, ties, and the like.

Projection 304 includes, in the illustrated example, a retaining portion 310 that has a vertical back surface for engaging a transverse edge or surface of a mounting point on the back of a standard. The retaining portion 310 assists with retaining the back of the standard firmly against a wall. The projection 304 also comprises an optional angled portion 311 that assists with capturing the mounting point and guiding at least part of the mounting to a point between the retaining portion 310 and the wall during mounting of the standard where the mounting point is seated. Seating each mounting point of each standard in the wall-mounted storage system at the same position on a cleat helps to ensure that the bracket mounting points of each of the standards are at the same level when multiple standards are mounted to a wall, assuming that the cleats mounted at the correct locations.

The retaining portion 310 is, in this exemplary embodiment, offset from the base to form an upward facing ledge 312 on which a portion of the transverse edge of a mounting point on a standard may rest. The ledge 312 is, in this example flat, straight and oriented horizontally with the cleat is mounted on a wall in its intended orientation. However, although there are advantages to the ledge as shown, in alternate embodiments the ledge may neither flat nor straight. It may also not have a surfaces or surfaces that are horizontal, as long as there is at least a point on which the transverse edge of a mounting point of a standard may rest. The distance between the retaining portion 310 the wall is, preferably in this example, chosen so that the standard, when a portion of its mounting point is properly seated between the retaining portion 310 of the cleats and the wall, is held against the wall, while possibly also allowing for expected manufacturing variations in the standard and cleats and variations in the wall to which the standard is on the standard. Shims between the cleat and the wall, and other devices for accommodating such variations, may be used, if necessary.

The cleat, in this example, has a width 314 that is less than the width of the standard, and preferably small enough to fit between inside surface of sides defining an internal void or space, into which the cleats can be inserted during mounting. Though not necessary, such an arrangement has the advantage of using the standard to surround and at least partially hide the cleats on which it is mounted. The construction of the standards should allow for a space large enough to accommodate the cleat, preferably with at least a portion of the side walls of the standard extending to the wall. To further enhance stability of the standard, and reduce movement or play, when mounted on the wall, the base 302 of the cleat, and optionally also at least part of projection 304 (such as retaining portion 310), can be sized and shaped (with, for example, straight sides) so that they closely fit against the inside surfaces of the side walls of the standard, while still allowing sufficient room to accommodate manufacturing and installation tolerances. The projection may, optionally, be shaped to facilitate catching the cleat and guiding mounting point toward a position in which it is properly seated. In this example, corners 316 are chamfered, which also narrows the end of the projection to make it easier to fit into openings in the back of a standard for accessing mounting points.

Although the foregoing embodiment of the cleat, and in particular the representative example shown in FIGS. 3 and 4, offers certain advantages when used with standards of the type described below, other embodiments of cleats could be used with these standards. Generally speaking, a suitable cleat with the standards described below can be any cleat that has a base for attaching to the wall, a ledge with which a transverse edge of one or more of the mounting points of the standard may cooperate when seated to prevent a standard from sliding downward on a wall, and structure for cooperating with the standard (either the structure of the mounting point forming the transverse edge or another structure that does not include the transverse edge) to hold it against the wall when the transverse edge is seated. Furthermore, the cleat shown in in FIGS. 3 and 4 could be modified and adapted better to fit or complement the transverse edges shown in FIGS. 5-15, or other configurations of transverse edges, some possibilities for which are mentioned below.

Various examples of mounting points are described below in connection with the representative examples of different embodiments of standards that are shown in FIGS. 5-9. The arrangement of mounting points on standards for a system are, preferably, consistent for each type of standard in a given system. It is possible for a system to use multiple different types of standards, each standard being intended to be used with other standards of the same type in constructing an installation, but not necessarily with other standards. Although there are advantages to having regular spacing—the mounting points being separated by the same distance or a regular interval—predetermined spacing patterns, without regular intervals, could be used. For example, in the representative embodiment shown in the figures, the regular intervals between mounting points for the standards used in the system is 512 mm, but could be set anywhere within a range of 100 to 1000 mm, or, in another embodiment, anywhere within a range of 300 to 700 mm, or in yet another embodiment, anywhere within a range of 400 to 600 mm.

Referring now to FIGS. 5-8, illustrated are three examples 502, 504, 506 of a representative segment of a vertical standard having at least one mounting point comprised of at least one transverse edge for cooperating with a cleat, such as the one shown in FIGS. 3 and 4, to hang the standards. Each example has a front wall 508, in which are formed slots (in this example, pairs of slots) 209 vertically spaced at regular intervals. As previously mentioned, these slots are an example of a type of connection point structure for brackets. Other types of connection points for brackets or other components of a wall-mounted storage system could be used in alternative embodiments. Each mounting point has a known spatial relationship with the bracket connection points so that, when several are hung from horizontally aligned cleats, the bracket connection points are also aligned.

Each of the standards 502-506 also includes two side walls 510 that depend from the front to form a U-shaped cross-sectional construction. This type of construction helps to provide sufficient strength for resisting bending and twisting under designed-for loads, as well as a define void or hollow volume inside the standard for accommodating hooks or tabs of cantilevered brackets inserted into the slots, and cleats attached to a wall when the standard his hung on them. The front and side walls are, in the examples, flat and continuous. However, in alternative embodiments, the front and side walls need not be flat or continuous. Different or more complex cross-sectional shapes may also be employed.

The terminating edges of the sides of standards 502-506 act as a back of the standard when it is placed against the wall. In these examples, the back, except for the mounting point, has a continuous opening along the length of the standard through which the cleats may be received. Alternately, the standards 502-506 may include a back wall. With a back wall, openings are formed adjacent the mounting point allow insertion of a cleat, or the openings are located so that a top edge of the opening forms a transverse edge.

Each of the examples of standards 502, 504 and 506 utilize a different example of a mounting point having at least one transverse edge. Standard 502 includes two tabs 512 on a back of the standard 502 that act as a mounting point. Each tab extends inward at a right angle from one of the two side walls 510. Each is designed to fit behind the projection 304 of cleat 300 (FIG. 3), and in particular between the retaining portion 310 of the cleat and wall when the cleat is attached to a wall and sit on ledge 312.

Figure 5:
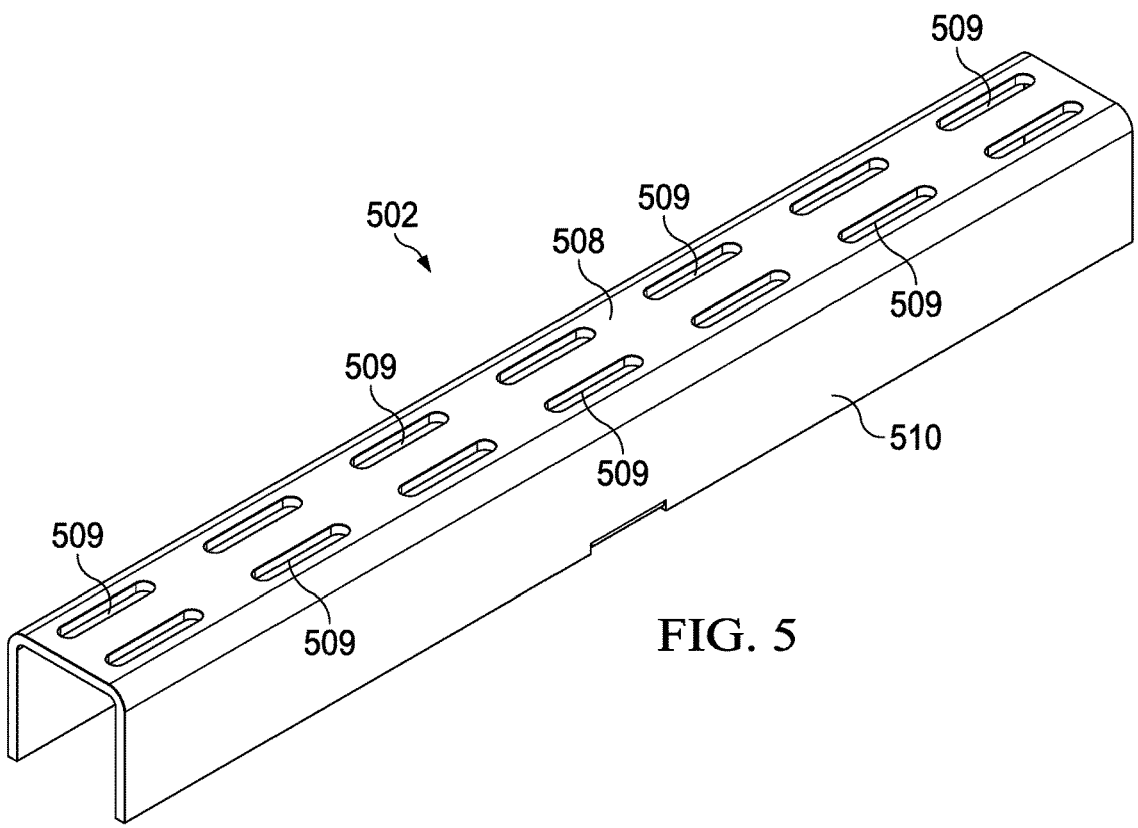
FIG. 5 is a perspective view of a first embodiment of a representative segment of a vertical standard for a wall-mounted storage system.
Figure 6:
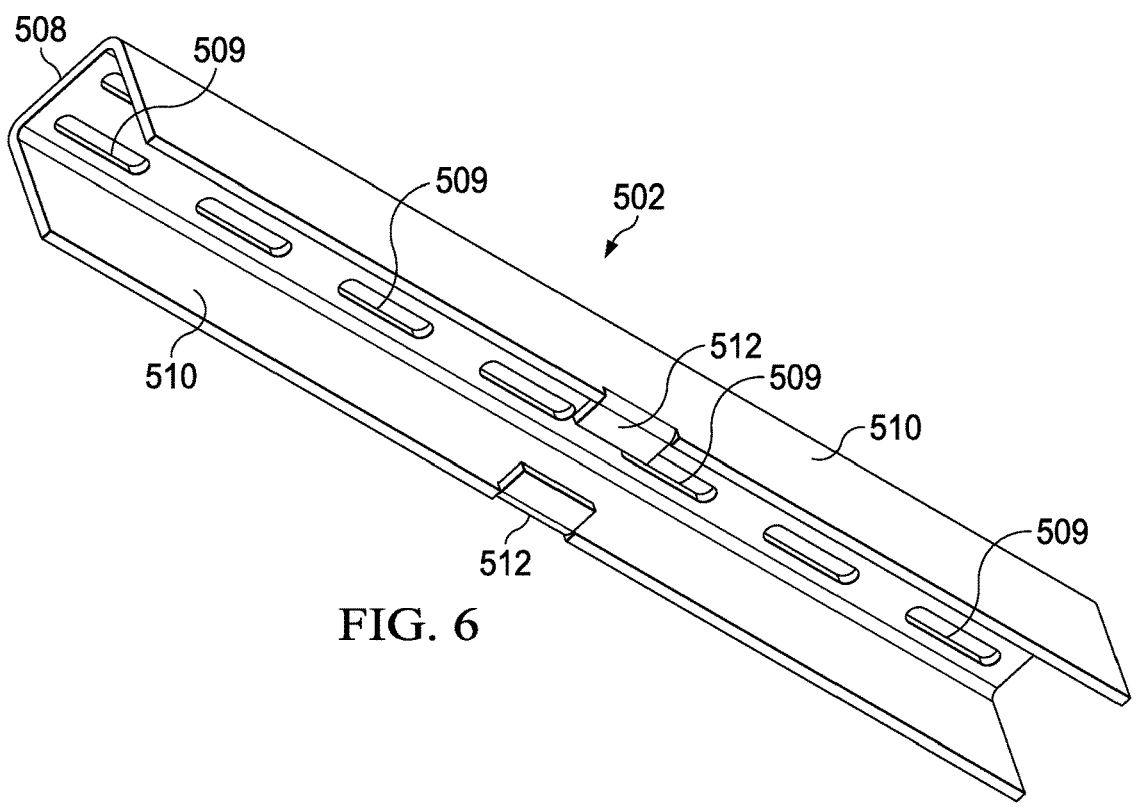
FIG. 6 is a different perspective view of the representative segment of the first embodiment of a vertical standard for a wall-mounted storage system shown in FIG. 6.

In the example of FIGS. 5 and 6, each tab 512 is integrally formed with the side wall by, for example, cutting a metal blank to define the tab, and then bending them. Although two tabs are shown, a single tab could be used. Tabs 512 are representative of a class of structural elements forming a mounting point that extend inwardly a short distance from the sides of a standard and present a transverse edge for engaging a cleat. For example, examples of alternative embodiments include a short pin or similar structures connected with the sides and extending inwardly, preferably, but not necessary, at a right angle to the inside surface of the side walls 510.

Figure 7:
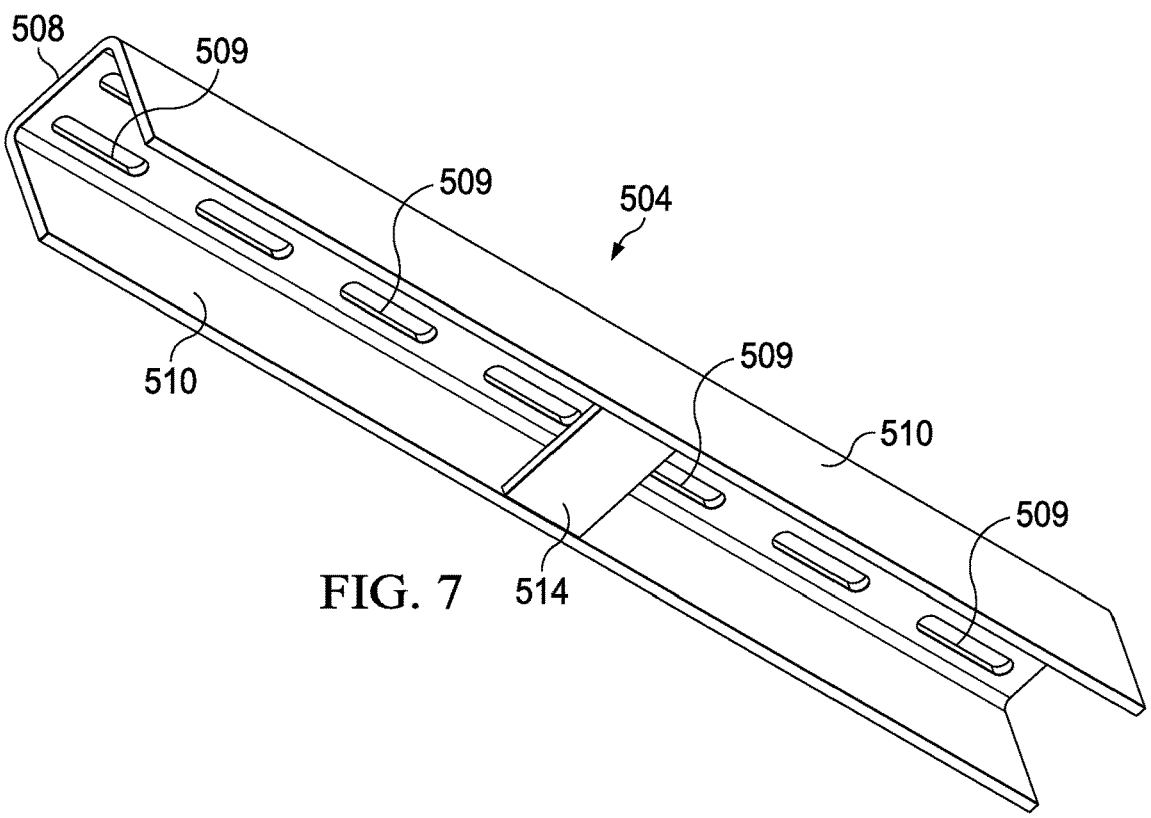
FIG. 7 is a perspective view of a representative segment of a second embodiment of a vertical standard for a wall-mounted storage system.
Figure 8:
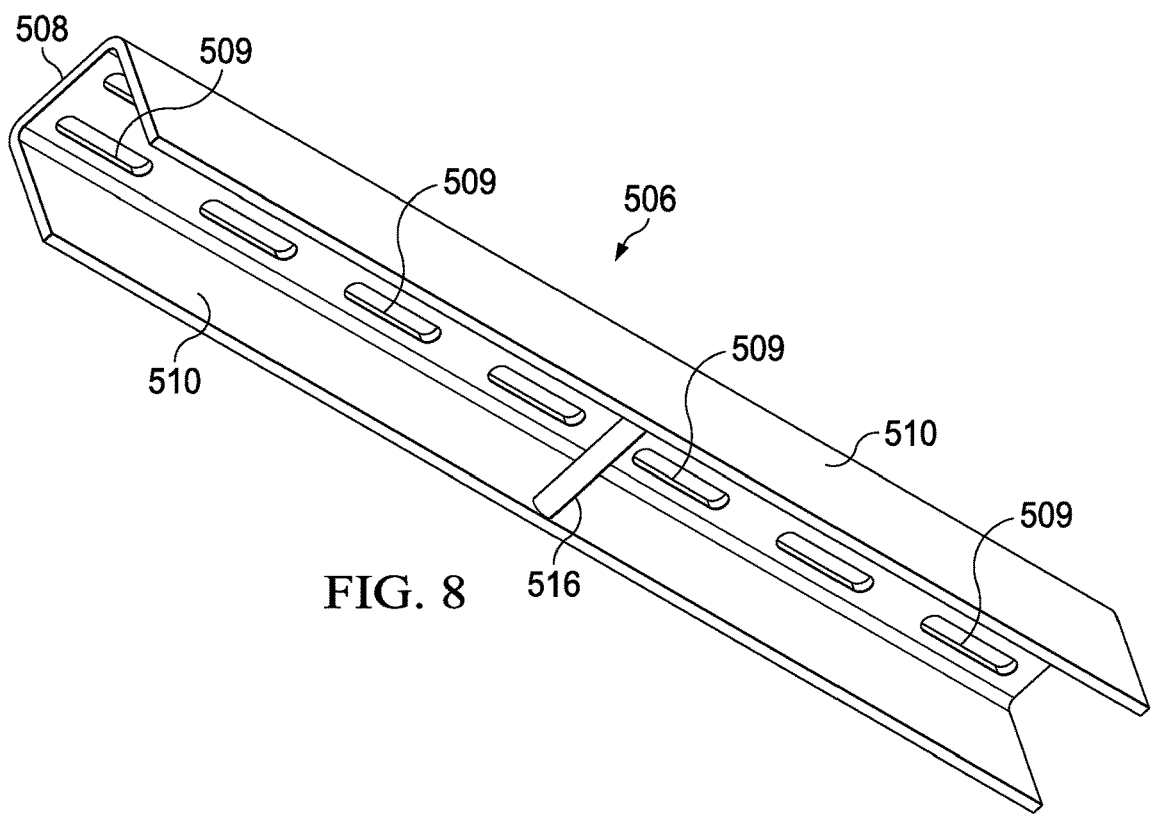
FIG. 8 is a perspective view of a representative segment of a third embodiment of a vertical standard for a wall-mounted storage system.
Figure 9:
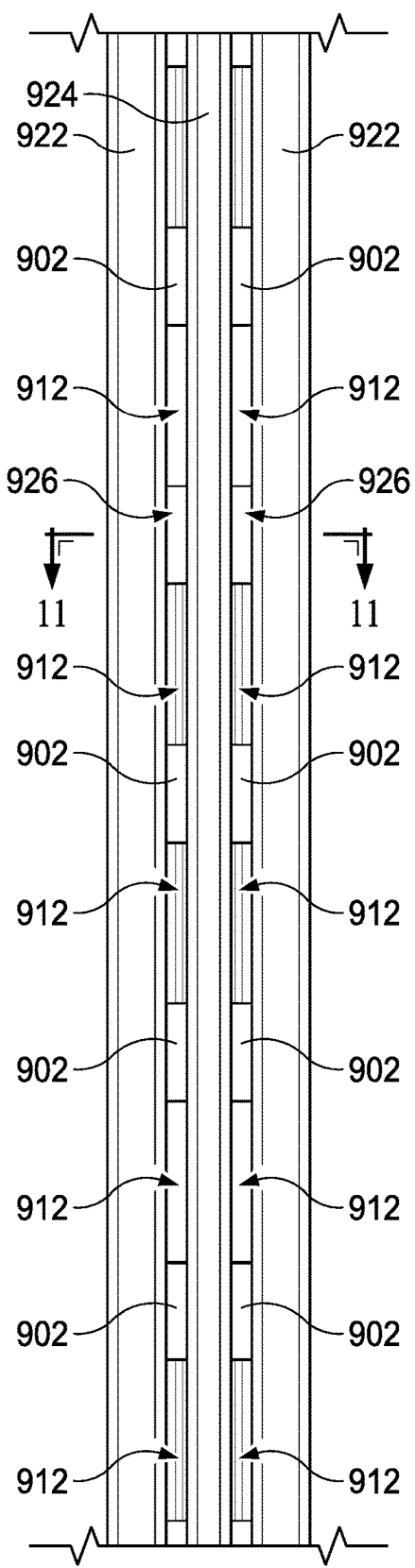
FIG. 9 is a front, elevational view of a representative segment of a fourth embodiment of a vertical standard for a wall-mounted storage system.
Figure 10:
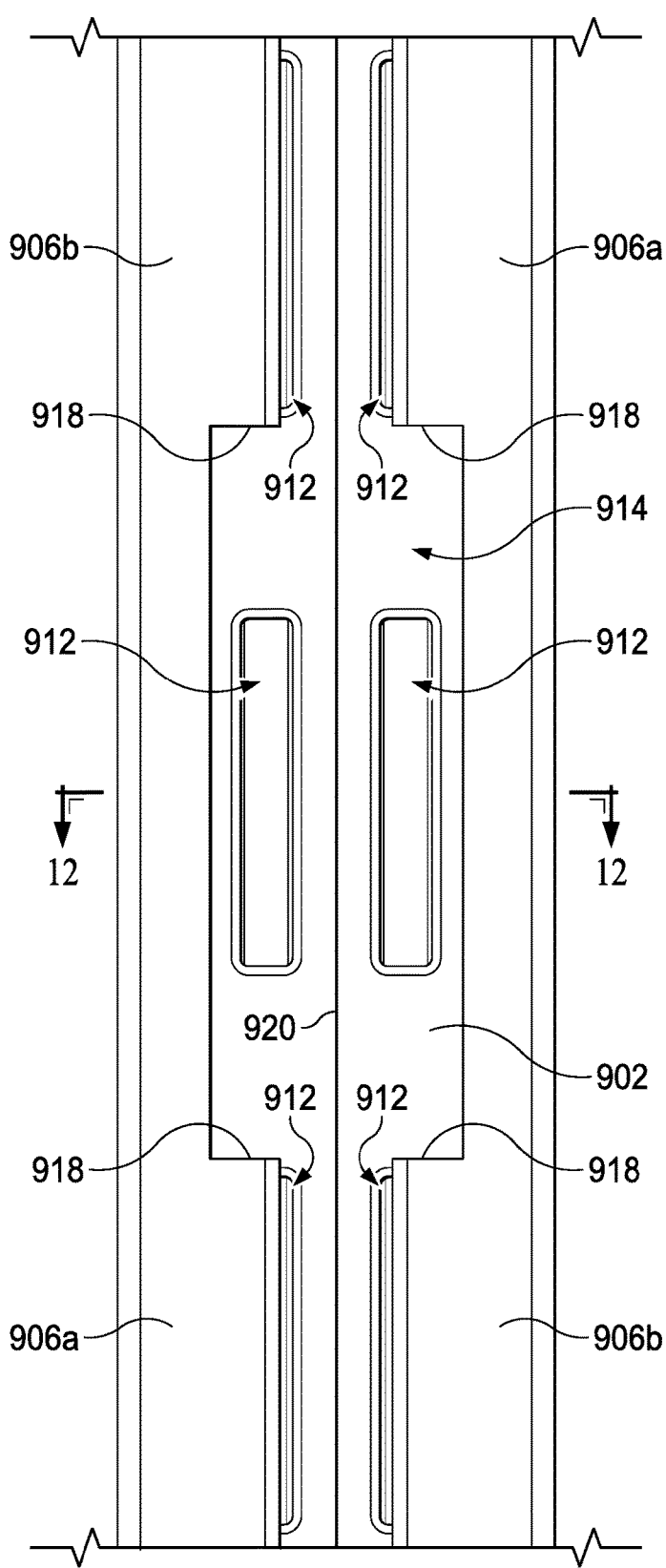
FIG. 10 is a rear, elevation of the representative segment of the fourth embodiment of a vertical standard for a wall-mounted storage system shown in FIG. 10.
Figure 11:
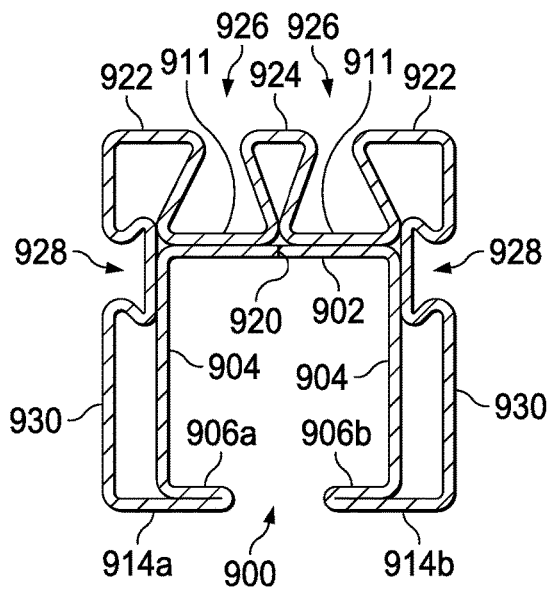
FIG. 11 is a cross-section of the segment of the fourth embodiment of the vertical standard in FIG. 9, taken at section line 11-11.
Figure 12:
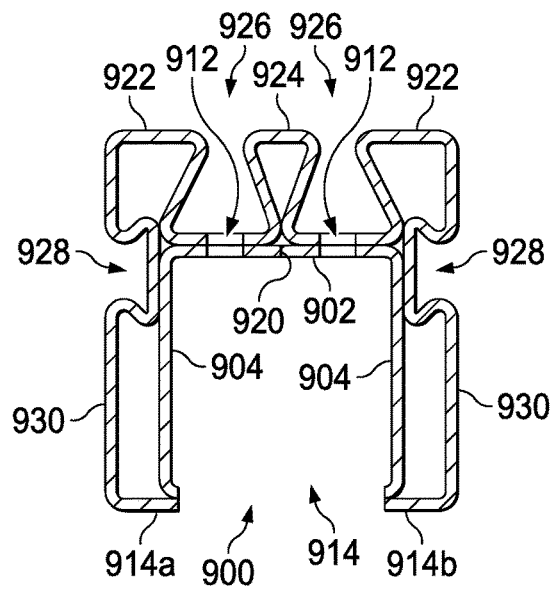
FIG. 12 is a cross-section of the segment of the fourth embodiment of the vertical standard in FIG. 9, taken at section line 12-12.

FIGS. 7 and 8 illustrate mounting points comprising a structural element with a transverse edge that extends across the back of a standard to form each mounting point and is connected to each of the side walls 510 of the standard. For standard 504, shown in FIG. 7, the structural member is a flat piece of material that extends across the back of the standard. A round pin 516 is used in standard 506.

Although the transverse edges in the illustrated standards 502-506 are straight and perpendicular to the central axis of the standard, the transverse edges need only have a portion that extends across a central axis of the standard and it need not be straight or perpendicular to the central axis. The central axis of the standard runs in the direction in which the standard is elongated. The transverse edges may be inclined to some extent in relation to the perpendicular direction and still function, either by itself in conjunction with one more other transverse edges forming the mounting point or other structural members of the cleat and/or standard, to prevent the standard from sliding in a downwardly on a wall and to register at least the vertical position of the standard to a known reference point on the wall for proper alignment of bracket connection points of all of the standards in the installation. Unless otherwise noted, or the context clearly indicates otherwise, the term "transverse edge" in intended to refer to one or more edges of a mounting point on the back of a standard that cooperate with a cleat to position a standard vertically on a wall. Although such edges might normally be straight to complement surfaces formed on the cleat, they might also be curved, with complementary surfaces formed on the cleat.

Although each example of a vertical standard 502-506 shows only one mounting point, each vertical standard in a wall-mounted storage system would be substantially longer and preferably include at least two mounting points spaced-apart by a standard, predetermined distance, or in a standard pattern. Each of the mounting points comprises at least one horizontally extending edge that acts as a transverse edge to cooperate with an interfering surface on a cleat to prevent the standard from sliding downwardly, as well as another edge or surface that cooperates with the cleat for retaining the standard against the wall when mounted. Preferably, at least a portion of each of the plurality of mounting points on a standard is designed to slide downwardly, behind a retaining member formed on a corresponding cleat when the standard is placed against the wall, over the cleats, and shifted downwardly in a single motion.

Figure 13:
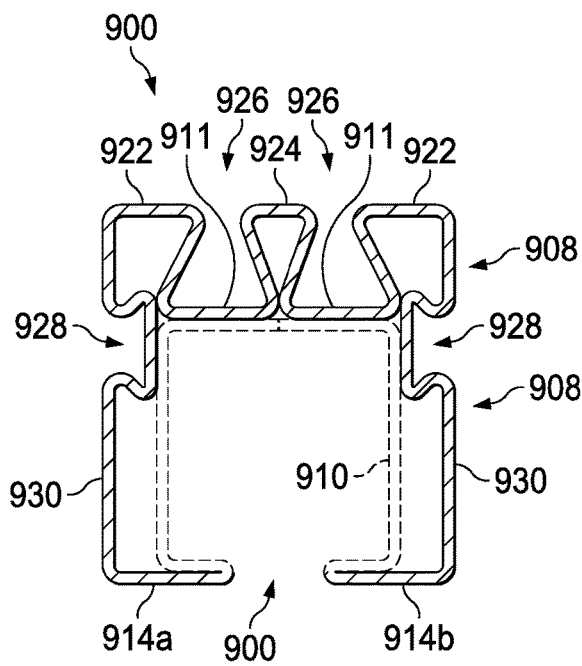
FIG. 13 is the cross-section shown in FIG. 11, with its core shown in phantom.
Figure 14:
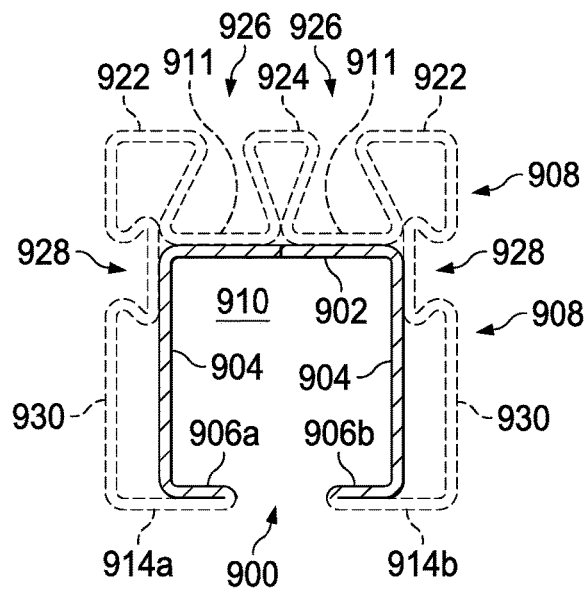
FIG. 14 is the cross-section shown in FIG. 11, with its outer envelope shown in phantom.

FIGS. 9-15 illustrate yet another example of an alternative embodiment of a vertical standard 900 that can be used with cleats, such as cleat 300, in a wall-mounted storage system. As with the preceding figures, only a segment of this embodiment of a vertical standard is illustrated. This example of a vertical standard has a structure comprising two primary components or portions, when seen in cross-section. First, it has a core, which is best seen in FIG. 14. The core comprises a front wall 902, sides walls 904, and rear wall portions 906a and 906b. The core is, in this example, rectangular or box shaped (in cross-section), which provides strength to the vertical standard to resist bending and twisting. Although a generally rectangular shape may have certain advantages, the core could be made in different shapes. Surrounding the core is an outer envelope, which is best seen in FIG. 13, which is a cross-section in which the portion of the standard comprising the core is shown in dashed lines. The envelope is generally referenced by reference number 908, and the core is generally by reference number 910. In FIG. 14, the portion of the cross-section comprising the envelope is shown using dashed lines.

Formed in both the front wall 902 of the core and a front wall portion 911 of the envelope that is adjacent to the front wall 902, are a plurality of slots 912. The slots serve as bracket connection points. The outer envelope also has a rear wall portions 914a and 914b that are partially adjacent to the rear wall portions 906a and 906b of the core portion. The space between the rear wall portions 906a and 906b, and 914a and 914b, is optional and allows for a fabrication method in which the standard 900, including core and envelope portions, can made from a single piece of metal. However, in alternative embodiments a rear wall extending across the entire back of the standard could be used, in which case rear wall of the envelope or core may be omitted, or a rear wall may be entirely omitted, as in the preceding examples of vertical standards.

Defined at regularly spaced intervals along the back of the standard 900 are openings 916, formed for example by cutting out a portion of the back walls. The openings are large enough to receive a cleat, such as cleat 300. The width of each openings is, in one embodiment, slightly larger than the width of the cleat 300 to accommodate cleats that might not be strictly aligned when attached to a wall. Transverse edges 918 and the portion of the back wall portions of the core and outer envelope adjacent to them at the end of each opening act as mounting points, depending on which end of the standard is chosen as the top end for cooperating with the cleat to retain the standard on the cleat. The standard could be made to function with either of its ends being the top end but can also be made to have a defined top end and a defined bottom end. The thickness of the back wall allows it to fit, for example, between the retaining portion 310 of cleat 300 (see FIG. 3) Although the transverse edges 918 in the illustrated embodiment are perpendicular to the central axis of the standard, the transverse edges need only have a portion that extends across a central axis of the standard. Furthermore, as previously mentioned in connection with other embodiments, the transverse edge does not need to be perpendicular to the central axis for the transverse edge to cooperate with a cleat to prevent a standard from slipping and register the standard (and particularly its bracket connection points) to a known reference point on the wall.

In this particular example, the envelope 908 defines an outer shape of the standard in a way that may not only create a more aesthetically pleasing shape and overall appearance, but also may be used to form a structure that performs one or functions not otherwise provide by its core.

For example, one advantage of an outer envelope, such as the representative example shown in the figures, is to at least partially obscure from view, at least when viewed from an angle, slots 912 and what might be seen through the slots, in particular cleats one which the standard might be mounted. The front of the envelope forms three, raised portions—two, raised corner portions 922 and a middle raised portion 924—that define two grooves 926 that, in this example, extend the length of the standard, to allow hooks and tabs (not shown) on the end of cantilevered brackets to be inserted into the slots 912. The grooves create, in effect, continuous, narrow opening that is spaced a distance in front of the slots that substantially reduces the viewing angle to see through the slots 912, while also creating a pleasing outside appearance and shape. On advantage to the particular configuration of an envelope shown in these figures is that the outer envelope and the front wall of the inner core coincide where the bracket is attached to the standard, where the slots 912 are located, which adds to strength to the standard where needed to reside the shearing and torsional forces applied to by the brackets, thus allowing the standard to carry a greater load on the bracket than would otherwise be possible without the double walls.

Figure 15:
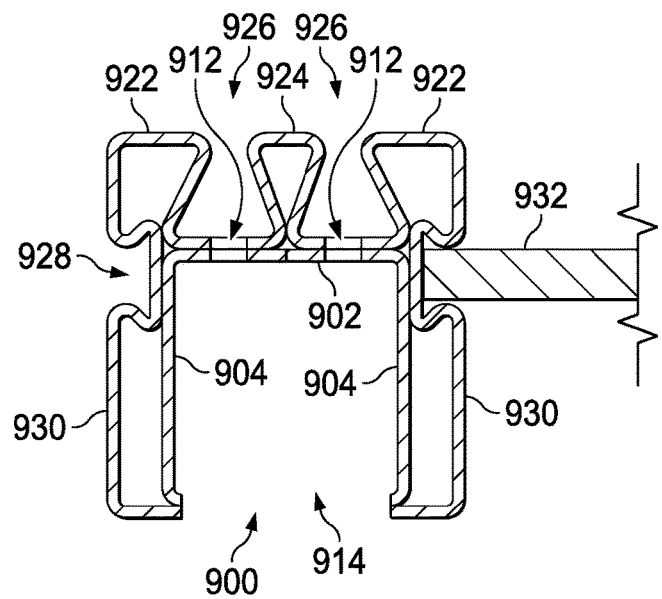
FIG. 15 is the cross-section shown in FIG. 12, with a cross-section of a partially shown panel inserted into a side slot.

Raised side or lateral portions 930 of the outer envelope 908, in this example, also function to define, with raised corner portions 922, two side grooves 928. These side grooves are optional and, in a one embodiment, run the entire length of the length of the standard. They function to receive and retain sides edges of panels extending between adjacent standards when mounted to a wall. FIG. 15 shows a side edge of a portion of a panel 932 that is slid or inserted into one of the side grooves. The panels may be decorative in nature, creating a more finished appearance to an installation of the wall-mounted storage system. Such panels may instead, or in addition, serve other purposes or provide other or additional functions, including serving as back panels of other types of components, such as cabinets, as well as surfaces to which other components may be attached.

The width at the top of each of the grooves 926 is at least as wide as the slots 912 comprising the bracket connection points and may be wider. The width at the top of each of the side grooves 928 are wide enough to receive the edge of a panel. The sides of the grooves 926 and 928 are angled, giving the grooves a triangular shape in cross-section, so that the grooves are wider at the bottom.

To fit through the narrowed opening at the top of the grooves 926, the hooks and tabs of brackets for connecting a bracket to the standard are made narrow to fit through the opening, the maximum width of the part of the bracket that passes through the opening in the top of the grooves thus being equal to or less than the distance across the opening.

The outer envelope may optionally be used, as it is in this one, to provide functions beyond hiding the slots 912 and providing an improved aesthetic appearance. In this example, it is used to strengthen the standard. As already mentioned, it can be configured in a manner to strengthen the point at which brackets are connected to the standard. The outer envelope 908, as a whole, has an increased second moment of area due to material from which the outer envelope is made being further outwards from the center of the standard as compared to a standard with only a box-shaped cross-section. Thus, the standard can be made stiffer with respect to bending about any axis perpendicular to a central axis of the standard that is extends along its length (in its elongated direction.) This added stiffness allows for relatively thinner sheet metal (as compared to a conventional, box-shaped standard at a given capacity) to be used to form the inner core and the outer envelope, thus potentially making the standard lighter. In the illustrated examples, sheet metal for forming the inner core and outer envelope can be as little as 1 mm thick, which results in a lighter, and yet still sufficiently stiff, standard.

The raised portions, in addition to adding stiffness, may also act against the sides of the brackets, as they extend through the opening in the grooves 926, to resist swinging from side-to-side. The thickness of each bracket may be chosen, for example, to fit closely against the sides of the top opening of the grooves 926, thereby cooperating with the outer envelope to align it and/or to provide greater lateral stability and resistance to bending or pivoting about the point of attachment to the standard.

In one specific example, the standard 900 may, for example, be made of a strip of sheet metal that is 190-mm wide, with a 0.8-mm thick that is cold formed in a process that provides a plurality of bends to create the cross-sectional shape shown in the figures. The opposing ends of the steel strip may meet in a seam 920, where the sides may optionally be welded together, in a continual weld or spot weld. The slots 912 may be created by punching the metal. By locating the seam 920 where the lateral edges of the strip of sheet metal meet at a midpoint of the inner envelope, the edges will not be visible or exposed to a user, thereby avoiding exposure to the use of burrs or sharp edges.

Although not required, the grid of reference marks for defining locations at which cleats or other fasteners are to be attached may be formed using a method that makes use of a tool. The tool comprised of a rigid, elongated element that has at one end a base reference position defined on the tool at fixed location, which can be centered over a reference mark. The tool has one or more additional reference points defined on the tool, each a fixed distance from the base position that corresponds. One distance is a predefined distance between vertical standards used by used by the wall-mounted storage system, and the other is a predefined distance between mounting points on vertical standards in the wall-mounted storage system. However, if the two predefined distances are the same for the system, no additional reference point is required. The tool has mounted to it vertical and horizontal carpenter's levels to orient tool vertically and horizontally when making marks to form the grid. The base reference position is placed at a user selected reference point where a cleat will be mounted for one of the standards. The tool may be placed horizontally to mark a location on the wall for a cleat for hanging the next adjacent standard, using the reference point on the tool corresponding to the spacing between standards used by the particular system. The tool may also be placed vertically, with the reference point on the tool corresponding to the interval between mounting points on the standards used by the system indicating where the mark for the next adjacent cleat is to be placed. The tools can then be shifted to any marked location and the steps of marking the next adjacent cleat locations in the grid repeated. This process is repeated until a grid of marks on the wall large enough for the installation is completed. Cleats are then attached to the wall where standards will be hung. Though it is possible to installer fewer cleats than mounting points on the back of standards, this process allows for the possibility of installing a cleat for each mounting point on the back of a standard, thus allowing for the maximum load for which the standard is designed.

In a one, representative example, the tool includes a needle (which includes any structure with a point that can be easily inserted partially into drywall, plaster, wood or other material that interior walls are often made of) fixed on the tool at the base reference position to allow the tool to be temporarily positioned over a reference mark and swung into either a vertical or horizontal alignment without causing the tool to move or shift from the reference mark, and at least means for marking the wall, an example of which is a punch, located at one of the one or more other reference points for forming a second reference mark where a cleat may be attached to the wall in to form a grid pattern of cleats. After forming the second reference mark, the tool is repositioned with its the needle on the second reference mark to form a third reference mark where a client may be attached on the grid. This process is repeated until a grid large enough to correspond to the desired layout of standards is formed.

Referring now to FIGS. 16-19, illustrated is method and tool 1600 for laying out cleats 1610 (an example of which is cleat 300), at the intersections of a precise grid of columns

1606 and rows 1608 on a wall 1602 that spaced apart by predetermined horizontal and vertical intervals (which may be the same or different), starting from a reference point 1604. This method allows cleats 1610 to be attached to the wall along a vertical column, at correct intervals corresponding to mounting points on the back of the vertical standards 1612, and in rows with spacing corresponding to predefined widths of components used by a wall-mounted storage system. The standards, when mounted to the cleats, will be oriented vertically and parallel to each other, with the proper spacing between them and correct alignment of the bracket connection points on each of the standards. Although such a method and tool have particular advantage when used with embodiments of wall-mounted storage described above, they could be adapted for laying out other types of connectors or means for attaching a standard to a wall at multiple, predefined locations along its length.

Figure 16:
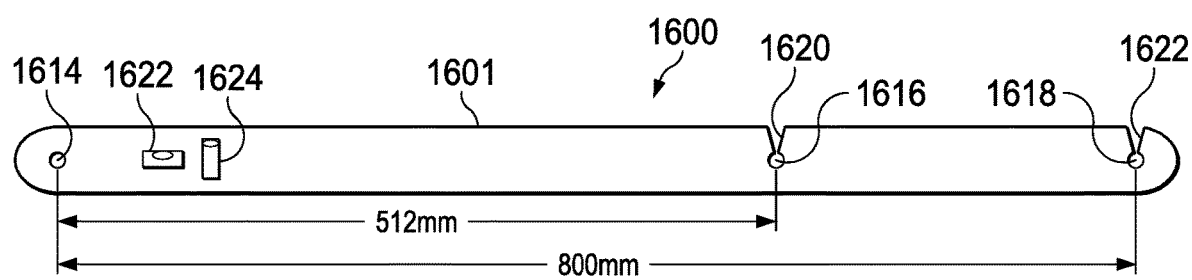
FIG. 16 is an elevational view of a tool used to layout the grid of wall connection points.
Figure 17:
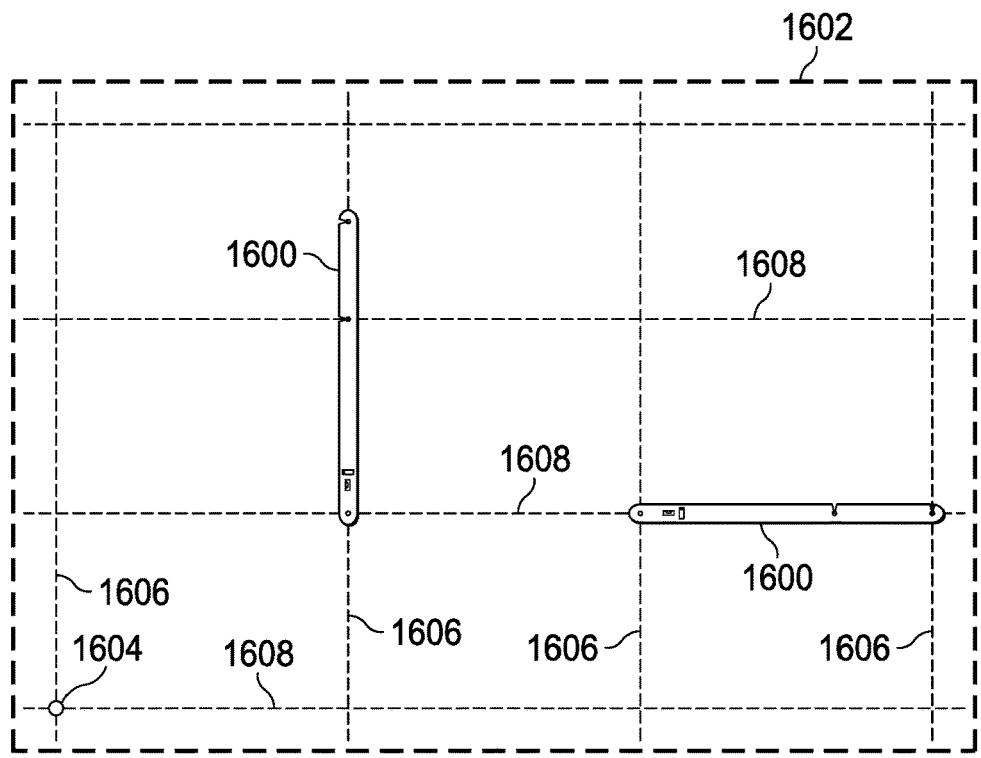
FIG. 17 is an elevational view of a wall showing a grid for defining wall attachment points for cleats for the wall-mounted storage system installation shown in FIG. 1.

FIG. 16 illustrates the tool 1600. Although aspects of the method can be practiced without tool 1600, or a modified tool, the tool, the tool offers additional advantages. Tool 1600 is comprised of an elongated member or body that does not bend, at least when placed against wall 1602, along the length of its central axis. It can be made from wood, plastic, metal or other. The tool includes, at a fixed position at one end, a needle 1614 which can be inserted into drywall, plaster, wood or other material that interior walls are often made of. The needle is a means for anchoring one of the tool and allows it to be swung to a horizontal or vertical position while remaining temporarily anchored to the wall at a reference point.

The tool includes at least one, and in this example, two punches 1616 and 1618 that are used to form a small hole or indentation in wall 1602 into which, for example, needle 1614 may be placed, and/or that is capable of visually indicating locations at which a cleat can be attached to the wall without deviating from the grid of vertical and horizontal lines. Each punch is mounted in a fixed position a predetermined distance from the needle (or other mechanism that anchors the needle) to either (i) the predetermined distance between mounting points for standards for the particular wall-mounted storage system, or (ii) the predetermined spacing required between standards for mounting standard components of the wall-mounted storage system. Depending on the particular wall-mounted storage system, these distances may be the same. Furthermore, wall-mounted storage system may allow for components of multiple widths, and therefore different spacing between adjacent vertical standards, in which case additional punches can be placed at the correct distance from the needle.

Alternatively, instead of multiple punches, a single punch could be moved between predefined positions along the tool and attached to those positions. Furthermore, although having one or more punches offer the advantages noted herein, some of the advantages of the tool can, nevertheless, obtained using, instead of a punch mounted to the tool, an aperture through which a nail, hand-held punch or other implement may be inserted to make a hole or other mark.

In this example, punch 1616 is located at 512 mm from the fixed needle 1614, and the second punch 1618 is located at 800 mm from the fixed needle 1614. Those measures are suitable for an example storage system where 800 mm is a desired distance between two adjacent standards, and 512 mm is a distance between two mounting points of a standard. These distances may be different in other embodiments, as they are set according to the specifications of the particular embodiment of the wall-mounted storage system with which the tool is intended to be used. In other embodiments, the spacing between mounting points for the standards used in the system may be in the range of 100 to 1000 mm, or in the range of 300 to 700 mm, or in the range of 400 to 600 mm.

There may be provided cut-outs 1620 and 1622 in the tool close to each punch, such that the user can visually verify that a mark in a wall has been made. Furthermore, tool 1600 may have rounded ends, each with a radius from the fixed needle 1614 and the most distant punch 1618 that corresponds to the smallest distance permitted or recommended distance for the particular wall-mounted storage system that is allowed between a vertical stand and a wall corner or other object on, or feature of, the wall 1602.

In a one embodiment, tool has mounted to it a vertical carpenter's level 1622 and a horizontal carpenter's level 1624 to ensure vertical and horizontal orientation of the tool when laying out the grid. The levels may be mounted anywhere on the tool that is visible to the user.

The punches in the representative example are a type of means for forming an indentation or hall in the wall to mark a location on the wall. The punches can be constructed, for example, using a needle, pin or other pointed member that leaves a relatively small hole or indentation, which biased toward a retracted position, in which it does not extend beyond the surface of the body of the tool that is placed against the wall, by a spring (flat, coiled or other type.) In one embodiment, pushing or hitting the punch a button overcomes the bias and causes the member to extend beyond the tool to leave a mark on the wall. Other embodiments, the user can pull or otherwise move a member that compresses a spring that, when released, imparts the necessary force to overcome the biasing force toward the retracted position and leave a mark on the wall. Other means for forming a mark could be substituted, though perhaps without all of the advantages offered by a punch.

The method of using the tool and laying out the wall connection points involves, in a one example, a user selecting and marking the reference point 1604 on wall 1602 where the storage system is to be installed. Using tool 1600, the user may then mark a grid on the wall as illustrated in FIG. 16. Typically, the horizontal level may first be used to mark points along a bottom horizontal line corresponding to the bottom-most of the rows 1608, starting from a reference point 1604 that will correspond to each of the columns 1606. The intersection points are then laid out vertically. To use the tool, the users places the needle at the reference point, levels the tool and operates the relevant punch, and then repositions the needle of the tool at the mark formed by the punch the hole, properly orients the tool, and operates the punch to form another mark.

Figure 18:
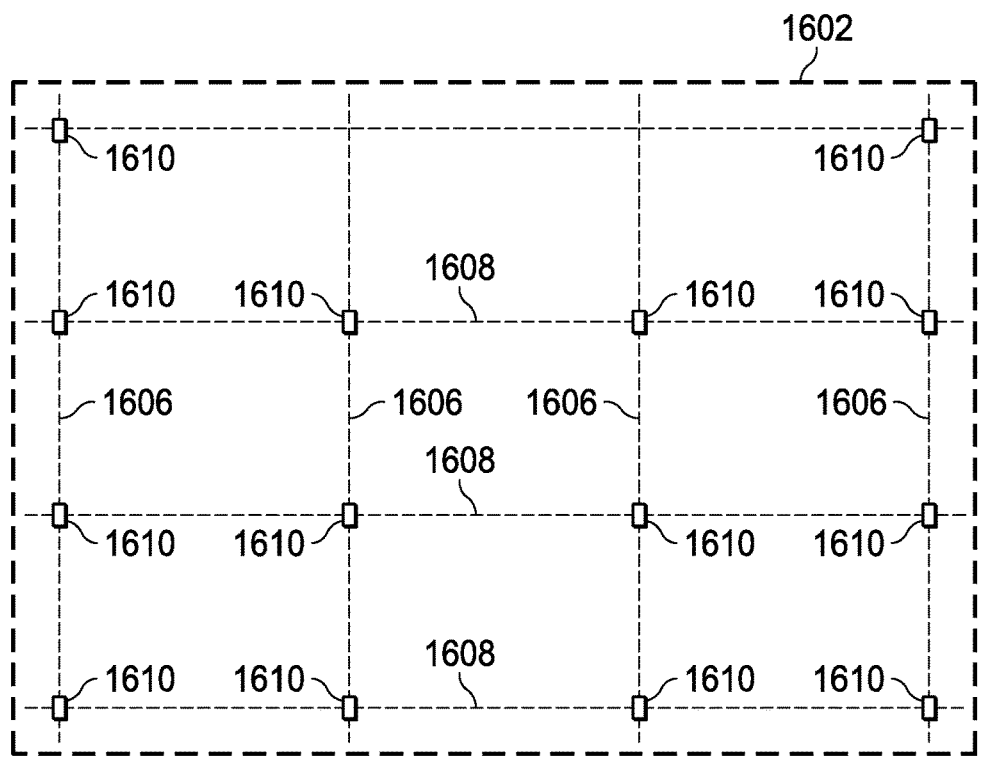
FIG. 18 is the wall shown in FIG. 16, with the cleats attached.
Figure 19:
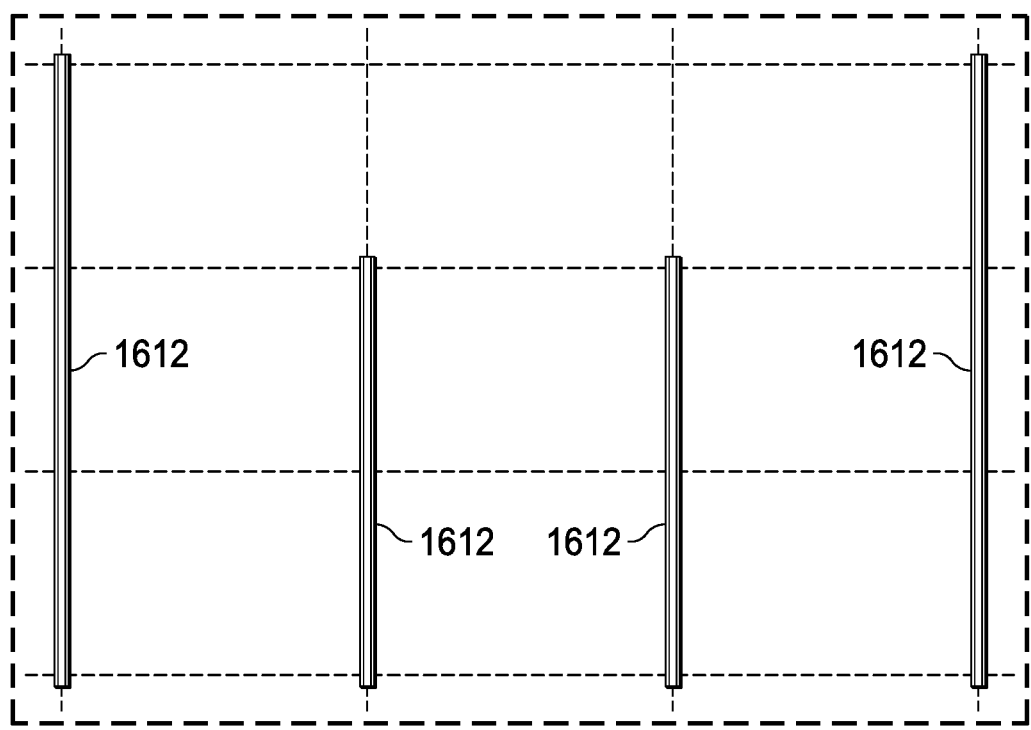
FIG. 19 is the wall with cleats attached, as shown in FIG. 17, with vertical standards mounted to the cleats.
Figure 20A:
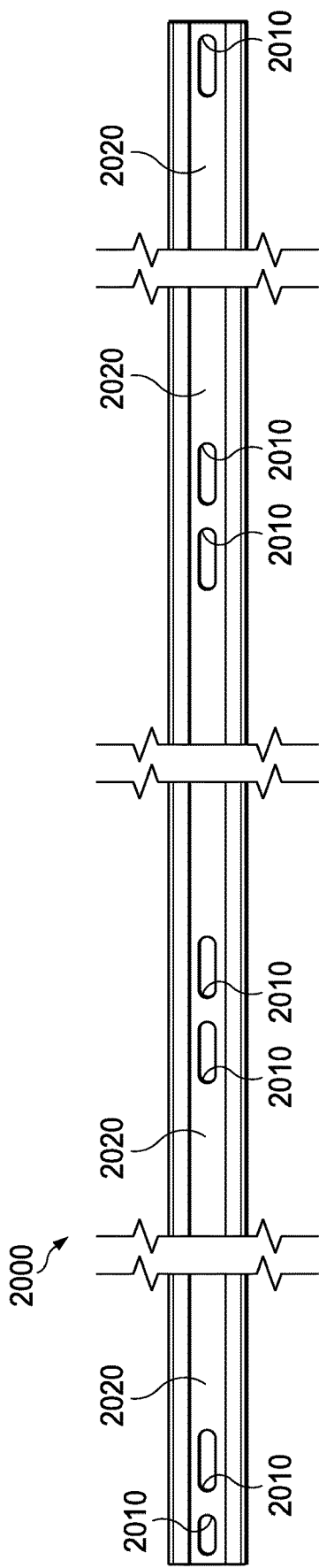
FIG. 20A is a view of a front side of a horizontal rail for a wall-mounted storage system.
Figure 20B:
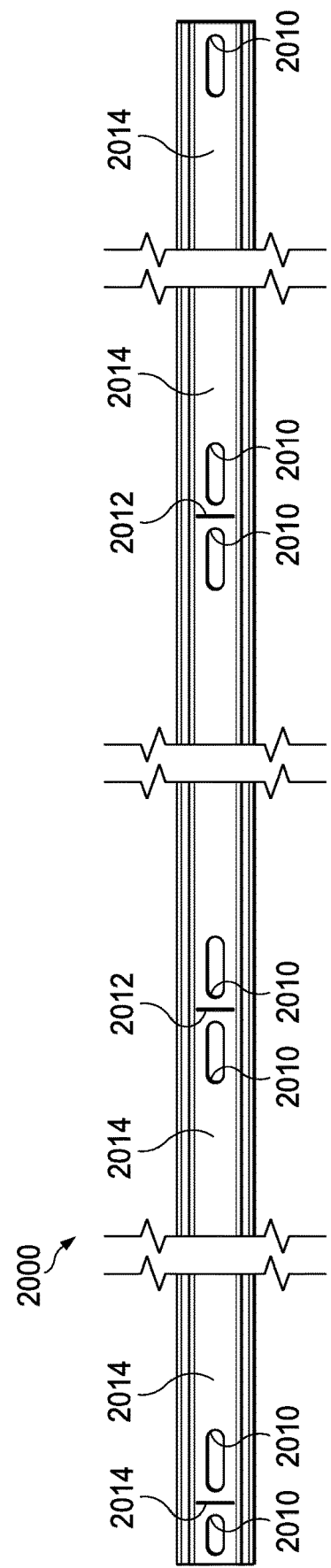
FIG. 20B is a view of the back of the horizontal rail shown in FIG. 20A.

Once all desired marks have been made, a cleat, such as cleat 300, or other type of fastener, may be fastened to the wall at each mark, as illustrated in FIG. 18, and the standards hung or otherwise placed as shown in FIG. 19. Although not shown, once the standards are placed, cantilevered brackets are installed and components, such as the shelves, cabinets and drawers shown in FIGS. 1 and 2, are hung or connected with the brackets to finish the installation. FIG. 1 shows such a finished installation corresponding to the examples shown in FIGS. 17-19.

Referring now to FIGS. 20A to 34C, which illustrate an alternate embodiment of a configurable and customizable wall-mounted storage system, cleats from which to hang vertical standards are not attached directly to a wall but are connected instead to two or more horizontals rail that have been attached to the wall. Using multiple horizontal rails allows a row of cleats to be attached without having to lay out individual cleats along in rows. Each cleat is hung onto the horizontal rail, and the cleats arranged into columns. In one example, the cleats are clamped to the horizontal rail to prevent movement and the vertical standards are hung on the cleats. In another example, the vertical standards are hung on the cleats and the cleats clamped to the horizontal rail and, optionally, the vertical standard is clamped to the cleats. Having a cleat with a clamp to secure it to allows the cleat to fit more easily attached and adjusted on the rail before secured to reduce movement and increase the rigidity of the installation. A cleat that also clamps a vertical standard also allows for easier installation and adjustment of a vertical standard on multiple cleats while allowing for improved rigidity of the connections after clamping. Non-limiting, representative examples of such horizontal rails, vertical standards, and cleats for a customizable, wall-mounted storage system are described below.

FIGS. 20A, 20B, 21, and 22 illustrate a representative, non-limiting installation of a plurality of horizontal rails rail 2000 attached to a wall for supporting a plurality of vertical standards. Each of the vertical standards will be, in this embodiment, attached to two or more horizontal rails. Each horizontal rail is elongated—its length is greater than its width—and straight. A central axis is defined by its length. It is preferred that its cross-sectional dimensions and shape consistent along its length at least in sections where vertical standards are intended to be attached. The horizontal rail 2000 is a representative example. It is attached to a wall 2002 using fasteners. The wall can be of any type of construction, such as drywall or masonry. Suitable fasteners are those capable of attaching to the particular type of wall a heavy object. In this example, the horizontal rails are attached to a wall constructed of drywall 2004 and wood studs 2006. Each rail is attached at two or more locations with its central axis oriented horizontally and level. If the ground or floor is level, the horizontal rails will be parallel to the ground or floor. Because the horizontal rail is being connected to the wall where the studs are located, wood screws 2008 are shown being used. However, other types of fasteners could be used to connect the rails to the wall, including various types of anchors.

Each of the horizontal rails includes multiple openings or slots 2010, through which fasteners can be inserted to hold the rail to the wall. One or more of the openings are, optionally, elongated along the rails central to provide flexibility on where to fasten the rail to the wall. In this example, the number, elongated shape, and placement of the slots allow for multiple screws to be screwed into wall studs of a drywall, even if the wall studs are not equally spaced or spaced according to standard practices.

A storage system may be designed to have a horizontal rail of one standard length or multiple standard lengths. A standard length, for example, can be equal to the distance required to accommodate one, two or three standard storage components arranged side-by-side in the system. To allow a standard length horizontal rail to be cut to a shorter length, each standard length horizontal rail may, optionally, be formed with markings 2012 on a back side of the rail to suggest the best locations for where to cut a standard sized horizontal rail to shorten it for use in the system. The marks are, in this example, are lines that are stamped onto the back surface of the rail. However, they could also be printed, cut, carved, or embossed in some other way. For example, a standard length rail would be long enough to support three standard storage components (a shelf or drawer, for example) side-by-side. If there is only enough room for a single storage component on the wall, the standard rail could be cut at one of the appropriate cut marks to have a rail that is just wide enough to support one storage component or a rail long enough for two. The markings avoid 2012 obviate a need for an installer to figure out the best location to cut the rail, reducing the risk of installation errors.

Figure 22:
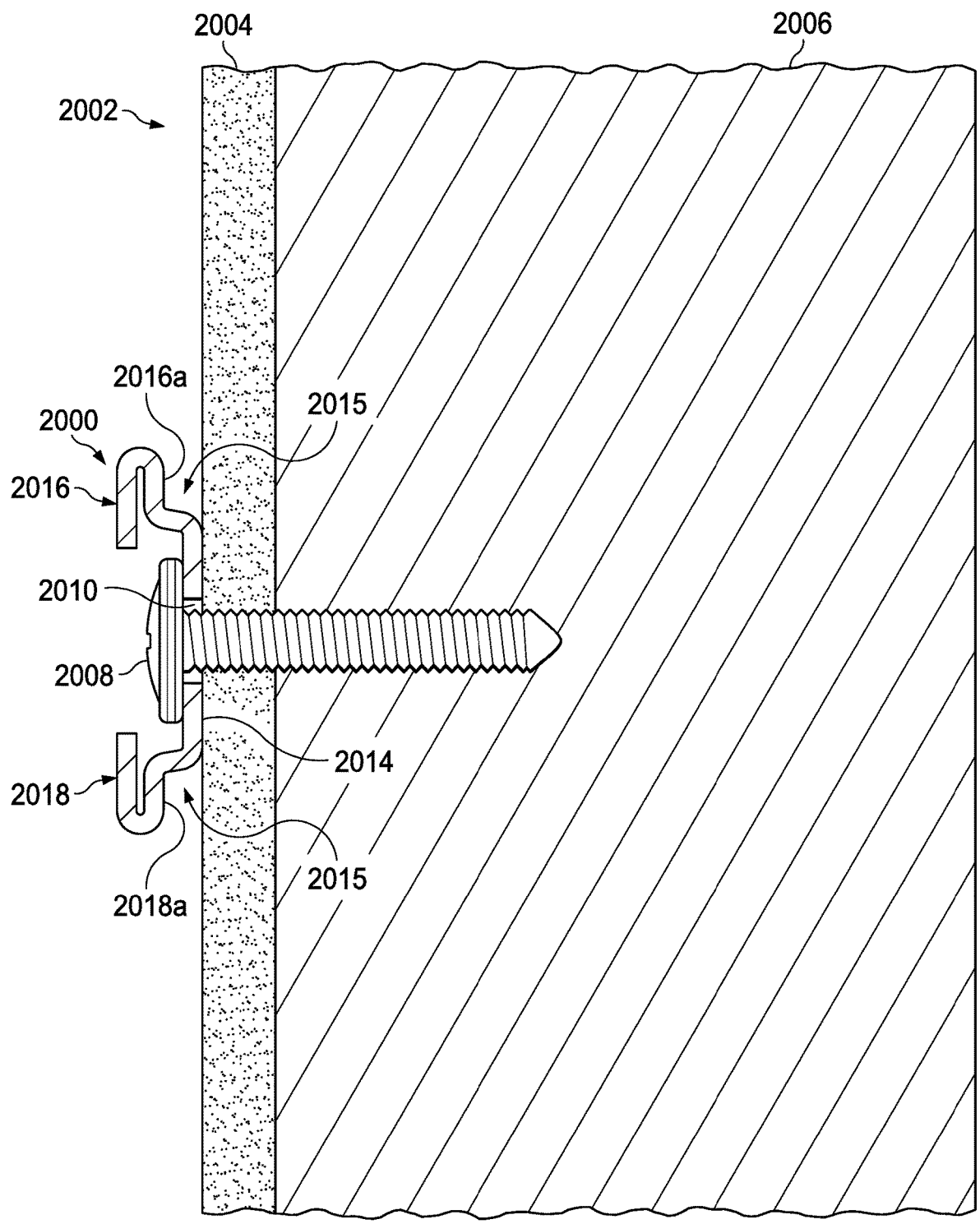
FIG. 22 is a cross-section of the horizontal rail of FIGS. 20 *a* and 20 B when attached to a wall.
Figures 23A, 23B:
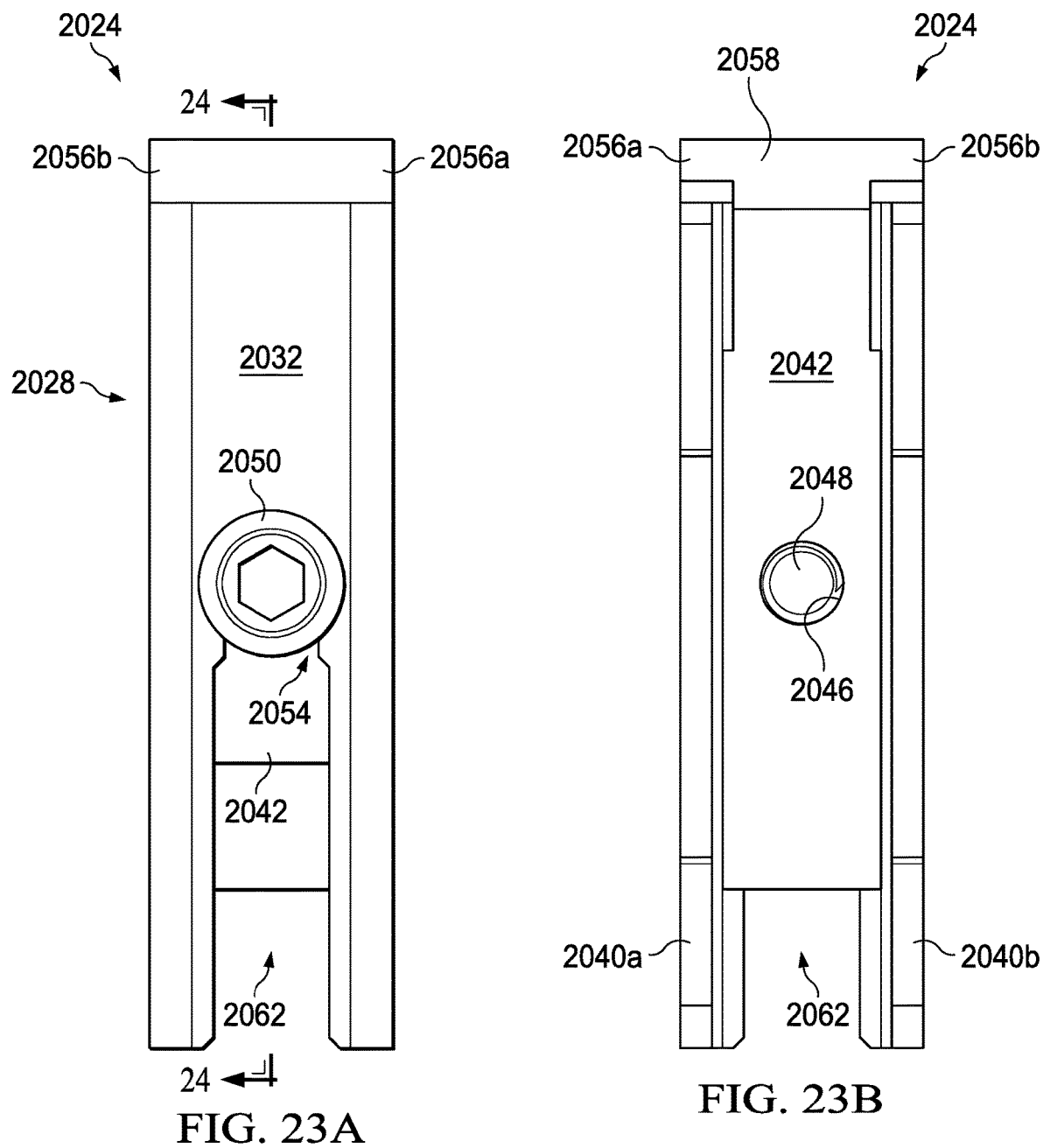
FIG. 23A is a front view of a cleat for attaching a vertical standard to a horizontal rail.
FIG. 23B is a rear view of the cleat of FIG. 23A.
Figure 23C:
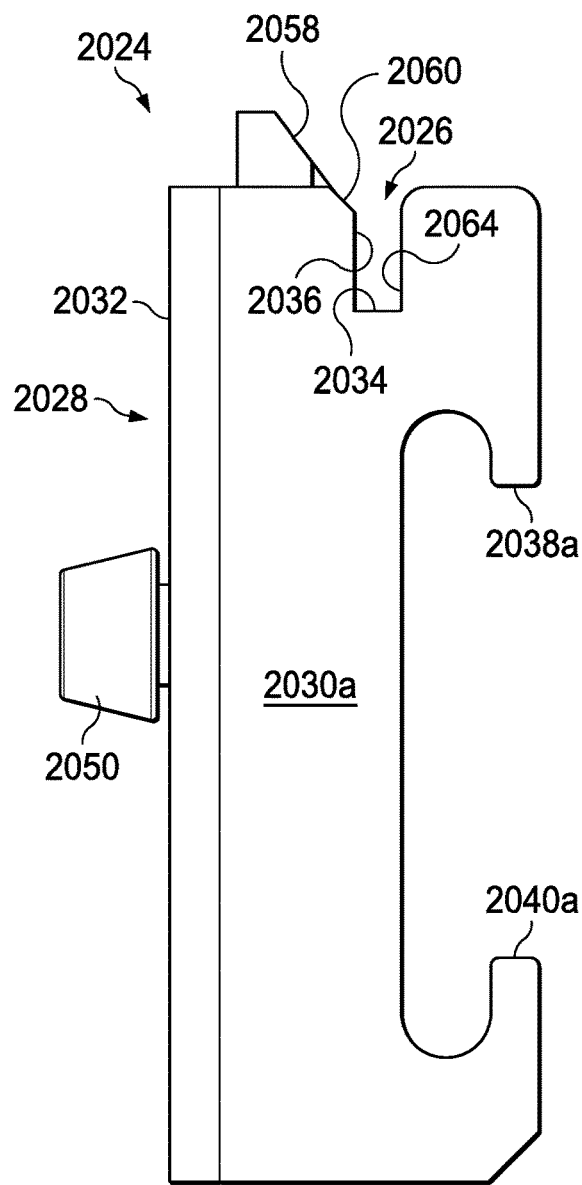
FIG. 23C is a side view of the cleat shown in FIG. 23 A
Figure 24:
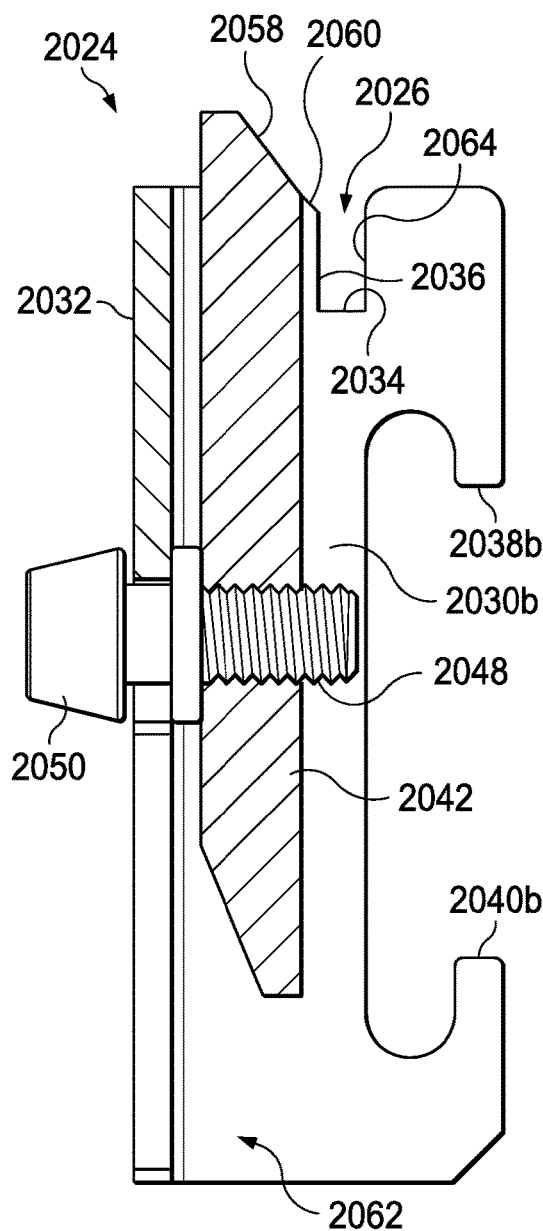
FIG. 24 is a cross-section of the cleat shown in FIGS. 23 A-C.
Figure 25:
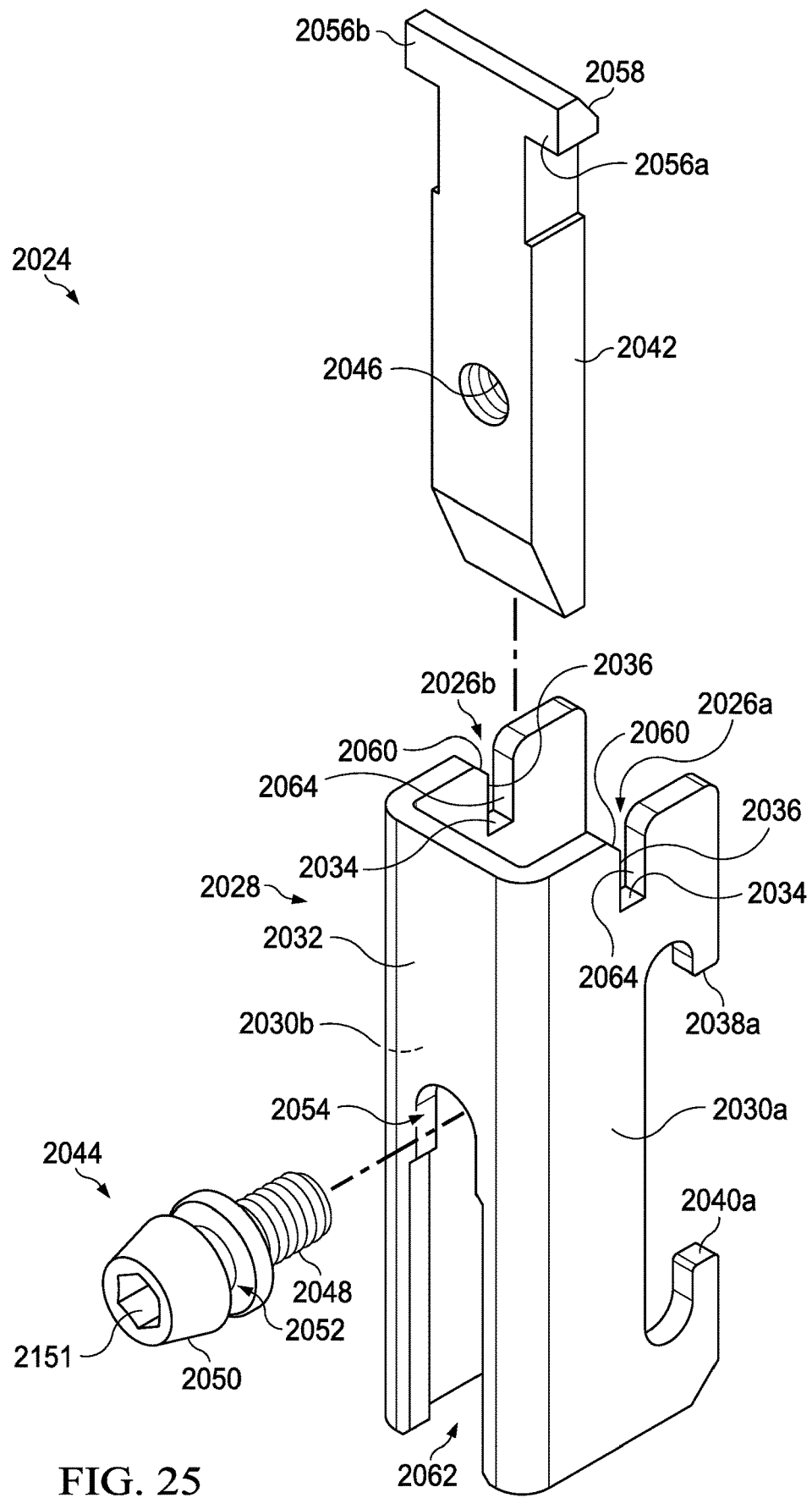
FIG. 25 is an exploded view of the cleat shown in FIGS. 20A to 24.

Horizontal rail 2000 includes a back surface 2014 that rests against the surface of the wall when attached, a top flange 2016 and a bottom or flange 2018. Note this particular example of a horizontal rail is symmetrical and can be oriented either way. Therefore, the designations of "top" and "bottom" for the rails are relative to its position when mounted on the wall. In other embodiments, the flanges could be made of different shapes or dimensions, with the rail having only one intended orientation. The back surface, top flange and bottom flange each extend along the entire length of the rail in a preferred embodiment. In cross-section, the back surface is preferably flat, but could be shaped to provide multiple contact points to enhance stability. The flanges are offset from the back surface 2014 so that, when the horizontal rail is attached to the wall there is a space 2015 between a back surface 2016a of the top flange and back surface 2018a of the bottom flange surface of each flange and the surface of the wall, as best seen in FIG. 22. In cross-section, the horizontal rail 200 has a midportion 2020 between the two flanges. The flanges have a flat, cross-sectional shape that is parallel to the back surface 2014 and to the wall surface when the horizontal rail is installed. However, the flanges could, alternative embodiment, be curved or have a different cross-sectional shape. For example, a distal or free end of one or both flanges—the distal end being the end opposite of where the flange connects to the midportion 2020, which will be referred to as the proximal end—could be wider or narrower (in cross-section) than the proximal end. Furthermore, though the flanges, and in particular the back surfaces 2016a and 2018a of the flanges, are parallel to the back surface 2014 and the surface of the wall 2002, the back surfaces 2016a and 2018b could be oriented at an oblique angle with respect to the plan of the back surface 2014 of the rail.

In this example, the horizontal rail 2000 is formed from a single sheet of steel that is folded into the shape that is shown in the figures. Each of the flanges 2016 and 2018 is formed by a 180° fold and thus has a double thickness. The midportion 2020 is a single thickness. The double thickness of each flange 2016 and 2018 makes it stronger and more resistant to deformation caused by a point load applied to the top, front or back of the flange, such as when a cleat is hung from the flanges to transfer to the wall the weight the storage system and its contents. In alternative embodiments, either one or both flanges could be made with a single thickness of metal of sufficient thickness is used to carry the weight of the cleats and other storage components that will hang from it. The illustrated construction, with double thick flanges, has the advantage of reinforcing the flanges without having to increase the thickness of the material beyond what is required for the midportion 2020, thus reducing the weight on the wall, making installation easier, and reducing the cost of fabrication.

In another alternative embodiment, the upper and lower flanges are offset from and extend inwardly toward each other (while leaving a gap between them) over the midportion 2020 to form a cross-sectional shape resembling a "C". In another embodiment, the top flange could be offset from the wall and extend away from the midportion, and the lower flange could be offset in front of and extend over the midportion 2020. In any of the foregoing embodiments, the bottom flange could be omitted as an alternative.

Figure 31A:
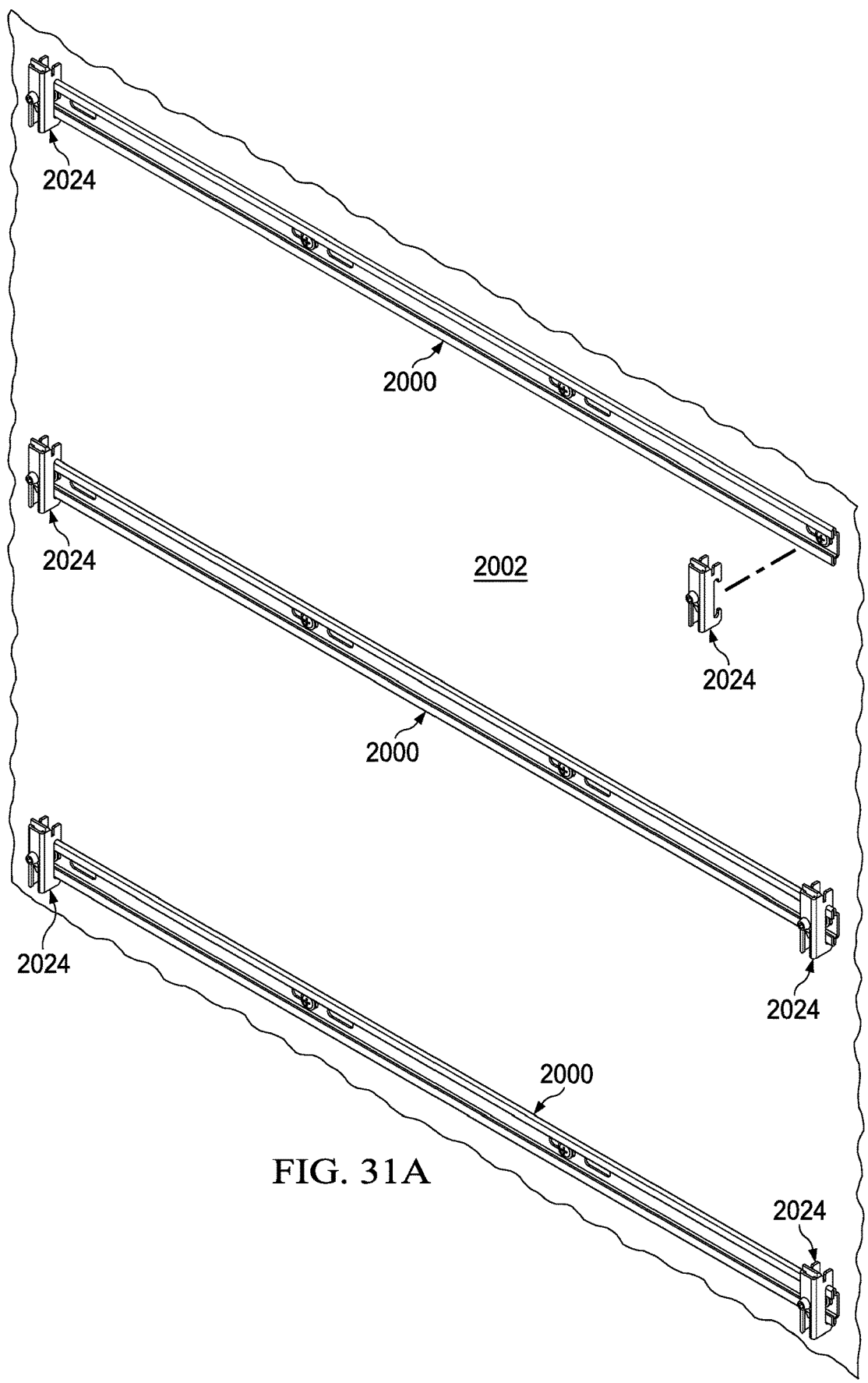
FIG. 31A-E are perspective views showing several steps of creating a wall-mounted support structure, to which cantilevered brackets may be attached to support storage components.
Figure 31B:
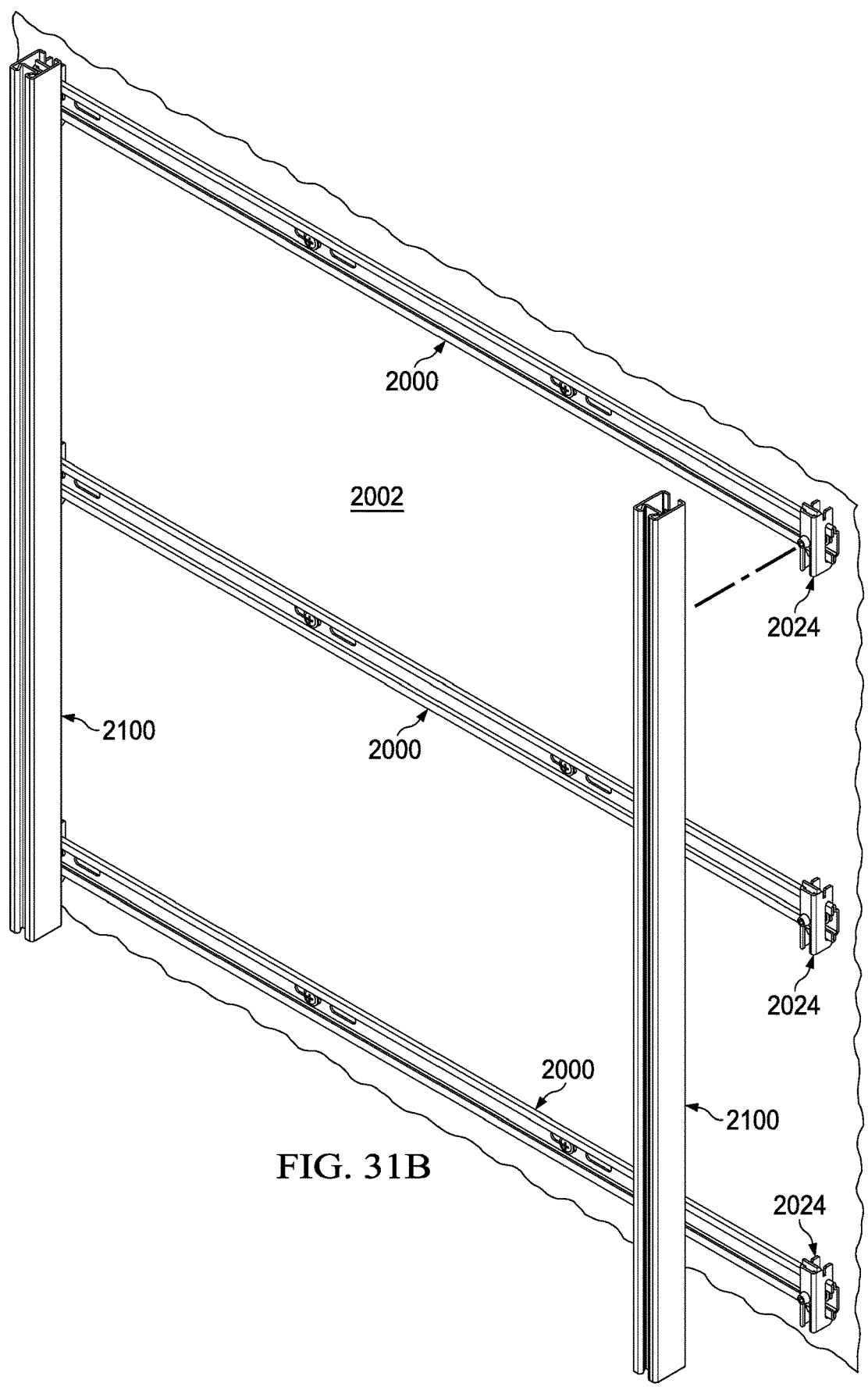
Figure 31C:
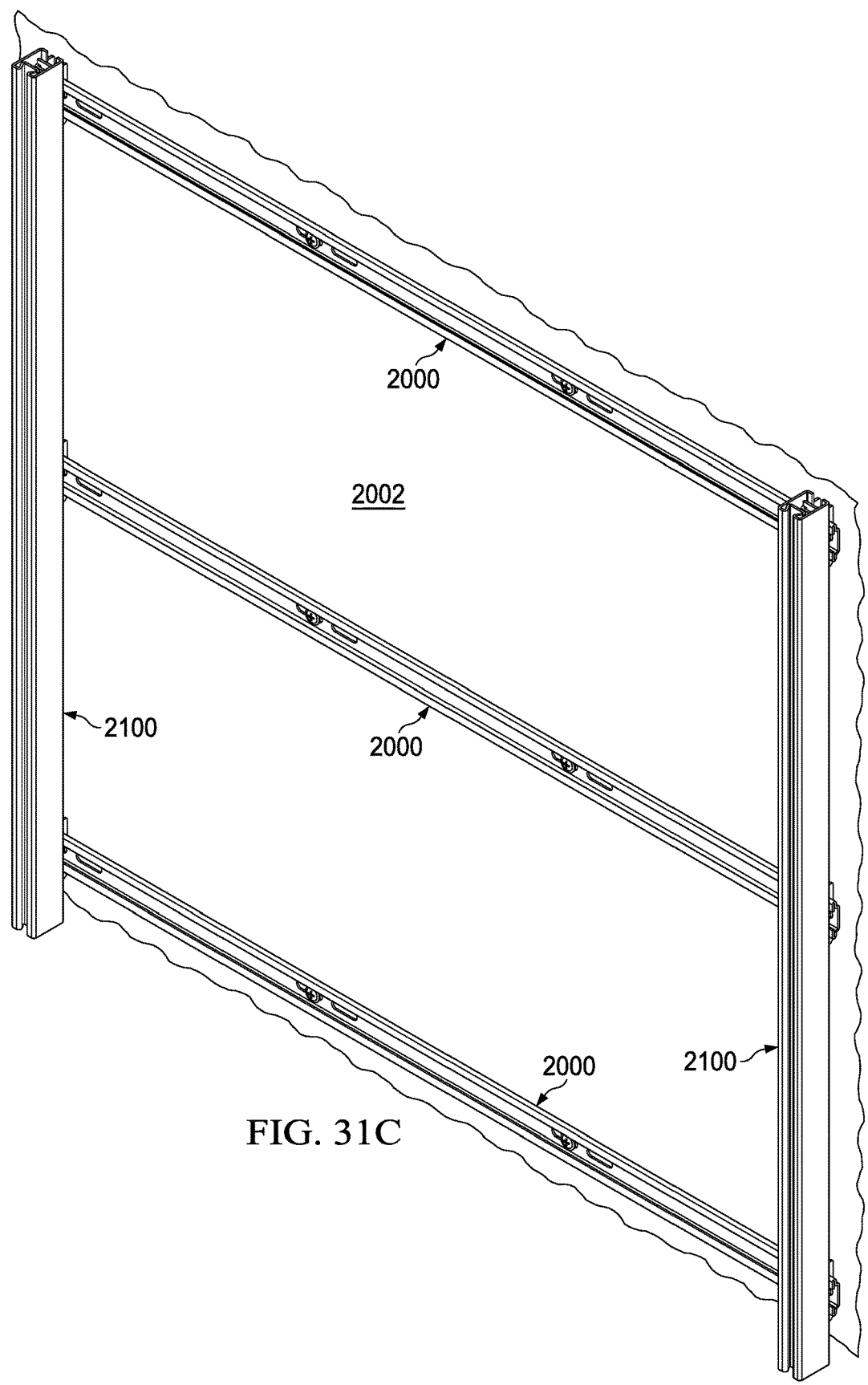

As shown in FIGS. 31A-B, at least two, and in this example three, rails 200oa are attached to wall 2002 and are used to connect cleats 2024 to the wall. The rails are mounted horizontally and level so that they each define a row along which cleats can be attached to the wall. The cleats are hung from and, in the illustrated embodiment, clasp to the horizontal rail in a manner that allows them to be slide laterally along the rail into positions in which they form columns of two or more cleats for supporting at multiple points standards that are vertically mounted and hung from them the cleats. The cleats can be fixed to the horizontal rail when they are in the desired position. Fixing them to the horizontal rail will improve rigidity and reduce movement and rattling. A screw, pin, clamp or other fasteners could be used to fix the position of the cleat on the role, either at predefined positions (which could be defined by some sort of feature, such a hole or ridge, on the rail that cooperates with the fastener) or, preferably, wherever on the rail an installer desires to place a vertical standard. A clamp is, therefore, one preferred method of fixing or locking the position of the cleat to the horizontal rail. A screw, cam, or similar mechanism could be used to clamp the cleats the horizontal rail.

FIGS. 23A-C, 24, 25 and 26A-B illustrate a representative example of an alternative embodiment for a cleat from which to hang or support a vertical wall standard. In this embodiment, rather than being fastened directly to the wall, the cleat is connected to the wall using a horizontal rail, such as the horizontal rail 2000 shown in FIGS. 20A and 20B. Each cleat has a first retaining portion for retaining a vertical standard on the cleat, and a second retaining portion that retains the cleat on the rail. The second retaining portion and rail function as a fastener to attach the cleat to the wall. The first comprises at least one surface that interferes with a mounting point of a vertical standard downwardly (toward the floor), and at least one surface that interferes with the movement of the mounting point outwardly (away from the wall), when the mounting point is received by the first retaining portion. As with the examples of cleats described above, the interfering surfaces in this example are defined by a recess formed by the cleat to receive a transverse surface of a mounting point on a vertical standard. The recess is, in the example in these figures, formed in an upper portion of the cleat. The recess can take the form of indentation or slot in a body of the cleat but may also be defined by a structural feature on the body of the cleat and another element, such as part of a horizontal rail or a wall on which the rail is mounted.

In the illustrated example, the first retaining portion of cleat 2024 is comprised a slot 2026, formed in a body 2028 of the cleat. The portion of the body in front of the slot, forms a projection for capturing a mounting point on the back of a vertical standard, such as any of those disclosed herein, and interfering with at least its downward and also outward movement. The term "slot" is intended to include any type of indentation or recesses in the upper portion of the cleat, or the combination of the body and an extension or other feature on top of the body forms at least one surface for interfering with a transverse edge of mounting point formed on the back of a standard to prevent downward movement of the vertical standard, and, preferably but optionally, also interfering with the forward movement of the mounting point so that the vertical standard tends not to fall off the cleat without first being lifted from it when the cleat is connected to a horizontal rail.

The body 2028 is comprised of two, parallel side walls 2030a and 2030b connected by a front wall 2032. The body is formed by bending a single sheet of metal in a U-shape. However, in alternative examples, the body could be made in a different shape and by a different method.

Because of the construction of the body in this example, the slot 2026 comprises two portions: slot portion 2026a in the side wall 2030a and slot portion 2032b in side wall 2030b. Each slot portion is capable of functioning independently to retain a mounting member. Unless otherwise indicated, a reference to a slot in the following description will refer to either one or both portions. Each slot defines a bottom surface 2034 that establishes a ledge on which the mounting can rest to interfere with a vertical or downward movement of the mounting point. Each slot also defines a front surface 2036 that can be used to interfere with outward or forward movement of the mounting point away from the wall.

Figure 21:
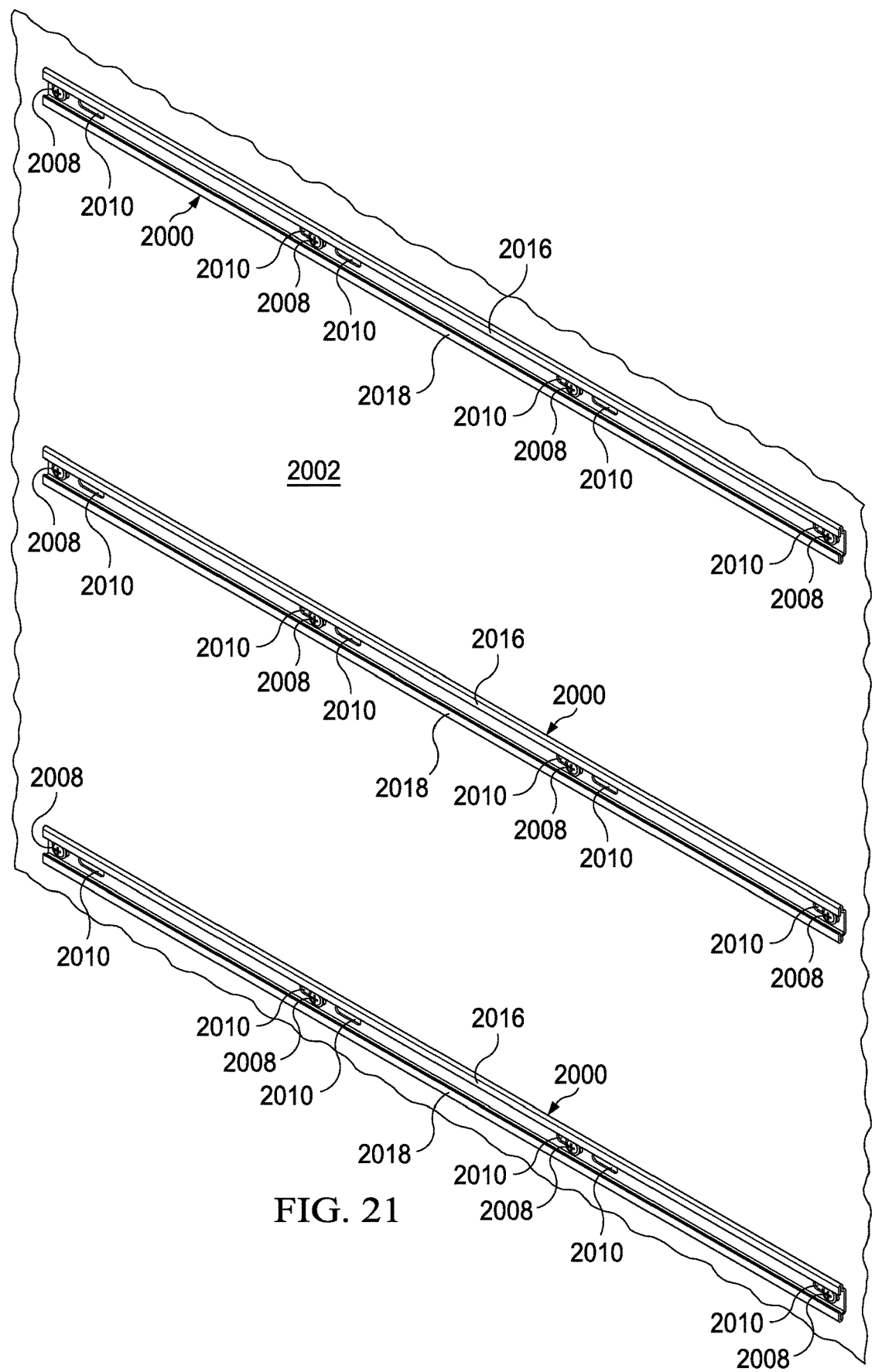
FIG. 21 is a perspective view of several horizontal rails attached to wall.

The second retaining portion of the cleat 2024 is, in this embodiment, comprised of at least one upper projection that depends from a rear or back of the cleat. In this example, there are two upper projections 2038a and 2038b, each of which are configured to cooperate with an upper flange on a horizontal rail and depend from the side walls 2030a and 2030b, respectively. When used with horizontal rail 2000, the projections are shaped to complement an upwardly extending upper flange, like flange 2016 on rail 2000 (FIG. 21), in a manner that prevents downward and outward movement of the cleat once hung or placed on a horizontal rail. The second retaining portion is also comprised of, in this embodiment, of at least one lower projection depending from the rear of the cleat. This example includes two lower projections 2040a and 2040b, each depending from side walls 2030a and 2030b, respectively, at the rear or back of the cleat. Each is configured by placement and shape to cooperate with a downwardly extending lower flange on a horizontal rail, such as lower or bottom flange 2018 on rail 2000 (FIG. 21). The lower projection will, in this embodiment, act primarily to reduce any tendency of the cleat to pivot on the rail. Furthermore, when used with a clamp as described below, both upper and the lower projections can be pulled against the upper and lower flanges of the horizontal rail, locking the cleat in place to prevent its movement relative to the horizontal rail.

In the illustrated example, the rear projections 2038a, 2038b, 2040a, and 2040b to be formed by cutting out a portion of the sheet metal, the projections thus being integral with the body 2028 of the cleat. The cut out has a shape that complements the cross-sectional shape of the horizontal rail 2000, with upper projections 2038a 2038b having a hook-like shape that reaches behind the flange 2016 to create interference with both downward and outward movement of the cleat relative to the rail 2000 when hung on it. Space 2015 created by the flange's offset from the wall accommodates the portion of the projection extending behind the flange, between the flange and the wall. Lower projections 2040a and 2040b also each have a hook-like cross-sectional shape that complements lower flange 2018 of rail 2000 that extend around the flange and into the space 2015 between the flange and the wall. However, in alternative embodiments, other shapes may be used, including for example ones with one or more flat oblique surfaces that cooperate with one or more complementary surfaces formed on the flanges. Furthermore, the projections need not be cut from the side walls but could instead, for example, be attached or integrally formed with the body by other methods, such as molding the body with the projections, welding them to the body, or otherwise.

Figure 26A:
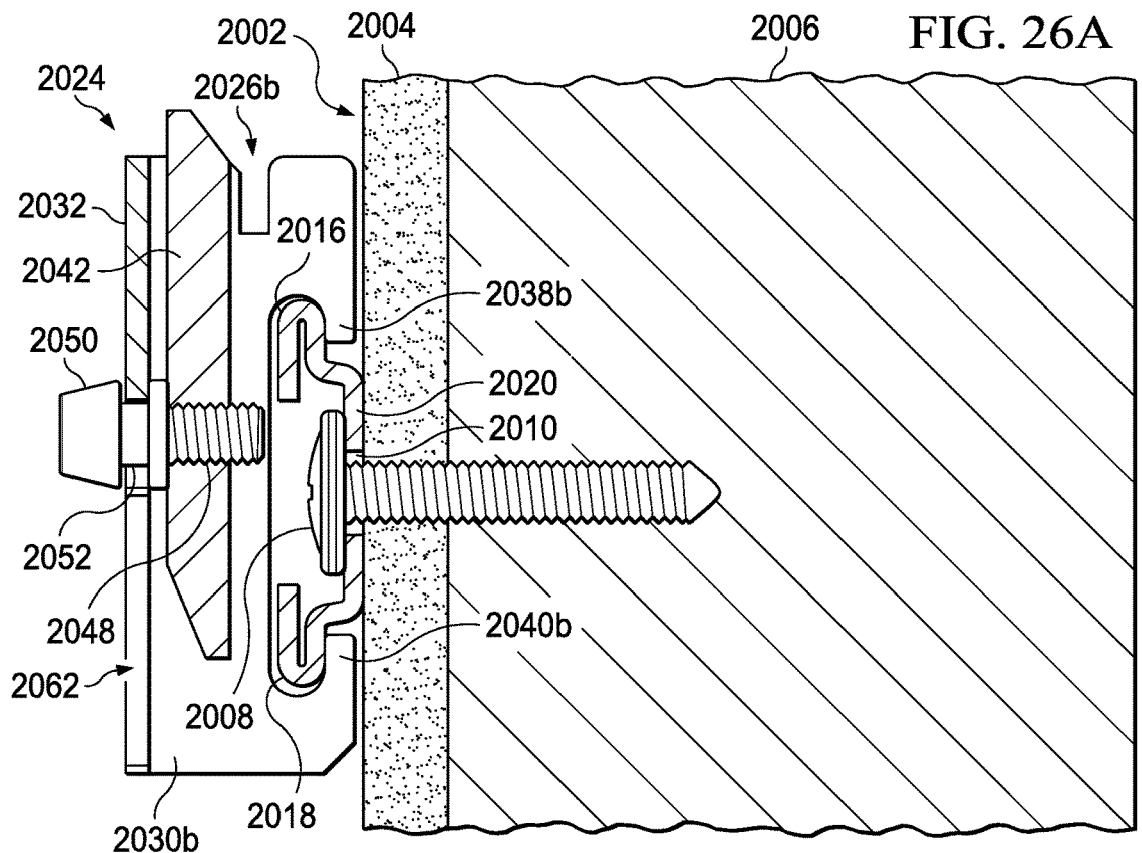
FIG. 26A is a cross-section of the cleat shown in FIGS. 20A to 25 mounted to the horizontal rail of FIG. 21 mounted to a wall, with a clamp that is part of the cleat in a retracted position.
Figure 26B:
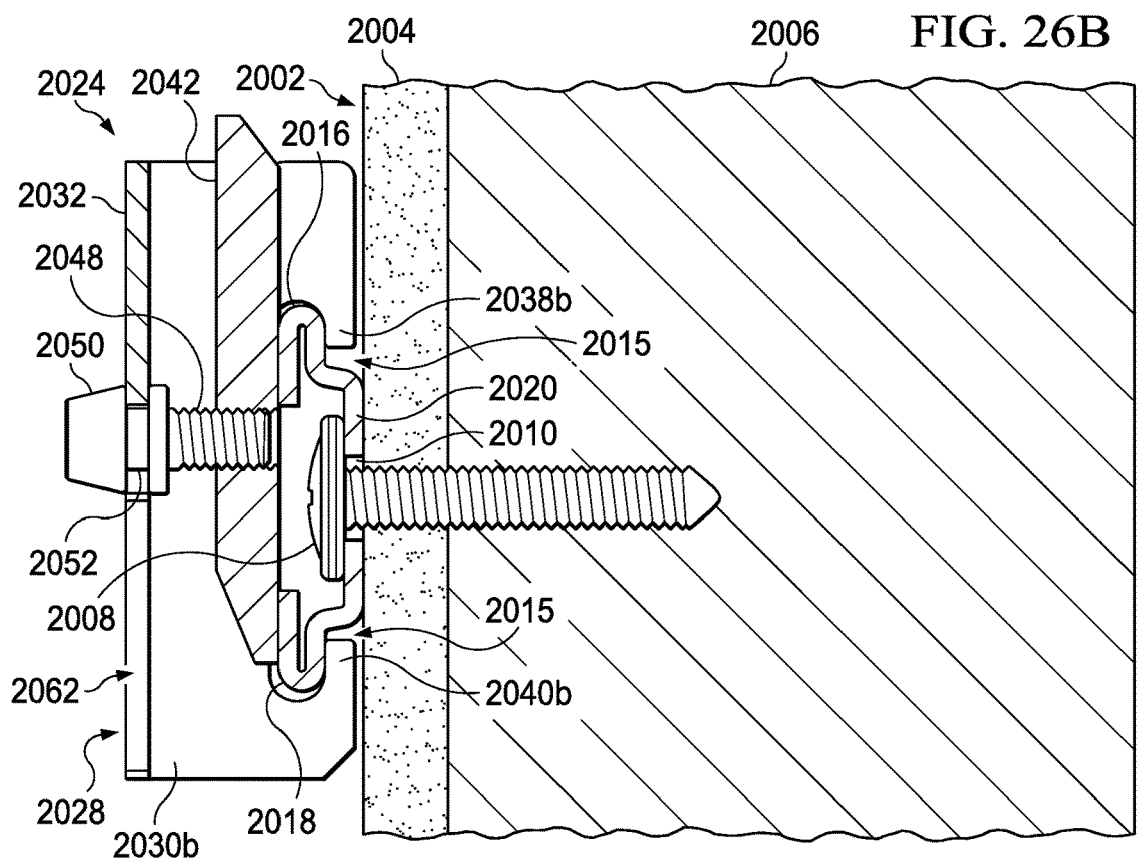
FIG. 26B is the cross-section of FIG. 26B with the client that is part of the cleat in an extended position.

Referring now also to FIGS. 26A and 26B, the cleat includes a clamp. In this example, the clamp is comprised of a tongue or plate 2042 that translates and or pivots relative to the body 2028. It can be moved from a fully retracted position shown in FIG. 26A to a fully extended position in FIG. 26B in which is applying pressure to the rail to pull the projections 2038a, 2038b, 2040a, and 204b against a back sides 2016a and 2018a of the upper and lower flanges 2016 and 2018, respectively, of a horizontal rail 2000.

The body 2028 defines a space between the side walls and front wall for accommodating displacement or movement of plate 2042 relative to the body and moving the plate into contact with the horizontal rail 2000. In this example, the plate is movable laterally by means of a screw 2044 that swivels on the front wall 2032. The plate 2042 has a threaded opening 2046 through a left-hand threaded stem 2048 of the screw extends. Rotating head 2050 of the screw pulls or pushes the plate because the plate is prevented from rotating by the inside surfaces of the side walls 2030a and 2030b. In this example, the screw head includes a hexagonal socket 2151 for receiving a hexagonal key or wrench. The head 2050 of the screw has cut in it a waist 2052 on which the screw can be journaled in a slot 2054 that is formed in the front wall 2032 of the cleat's body. The waist allows the screw to rotate freely and permit the angle of its rotational axis to pitch slightly but prevents it from shafting in an axial direction in reaction to the rotation of the screw causing the plate to shift.

Although the plate 2042 can be retained within the body of the cleat in different ways that allow it to be translated and/or pivoted, in this example the plate (or tongue) 2042 is inserted into the body 2028 from the top. The plate includes transverse extensions 2056a and 2056b that act like arms that extend beyond the plate's side edges to interfere the body 2028, in particular the top edges of side walls 2030a and 2030b, to retain it in a manner that allows the plate to translate and/or pivot about the arms. When the stem 2048 of the screw 2044 is inserted into opening 2046, the plate is restrained from falling out of the body by the screw, and the screw is prevented from falling out of the slot 2054 by the plate. Slot 2054 is open at one end to allow easy assembly of the screw and plate within the cleat.

The top of the plate 2042 also extends beyond the top of the body 2028 of the cleat and has chamfer that, when the plate is retracted, aligns with a chamfer 2060 formed on the corner along the front side of each of the slots 2026a and 2026b. The chamfers help to maneuver a transverse edge of a mounting point on a vertical standard into the slot and to ensure that it is properly seated in the correct position during assembly.

A lower portion of the front wall 2032 of the cleat 2024 is removed to form an opening 2058 prevent interference with connecting portions of brackets that are inserted through slots.

Figure 27:
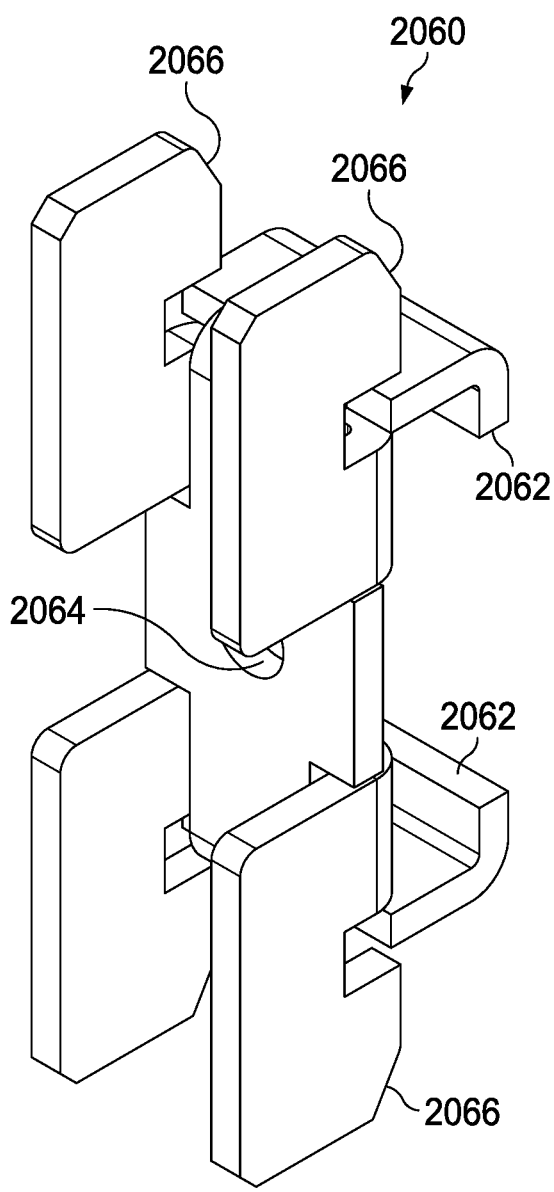
FIG. 27 is a perspective view of an alternative embodiment of a cleat.
Figure 28:
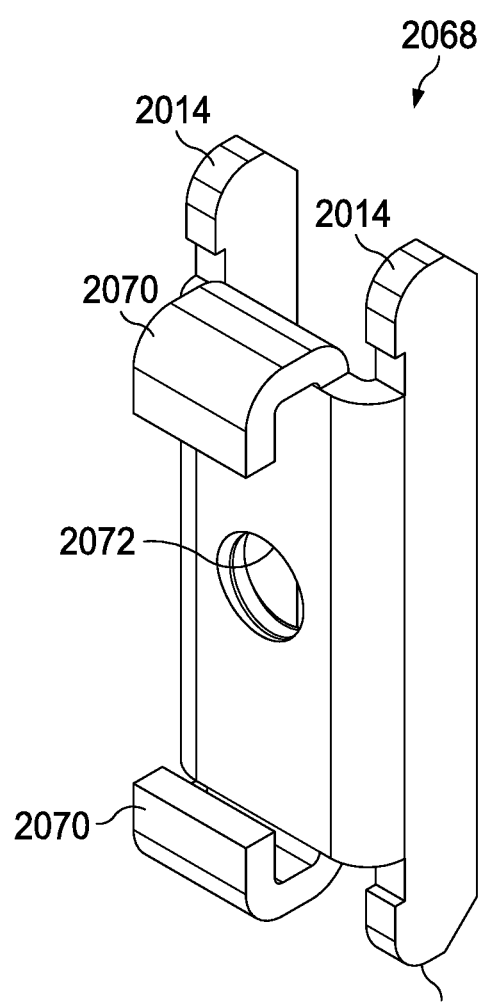
FIG. 28 is another alternative embodiment of the cleat.

FIGS. 27 and 28 are examples of an alternative embodiment of a clamp for a cleat. Cleat 2061 of FIG. 27 includes hook-like projections 2063 are used to clasp upper and lower flanges on a horizontal rail, like horizontal rail 2000. A screw (not shown) is threaded through threaded screw hole 2065 is tightened against the horizontal rail to clamp it in place. Projections 2066 cooperate with transverse edges on a back of a vertical standard, like any of those mentioned in this written description. The cleat is symmetrical and can be hung either direction. The vertical standard is hung the one of the projections 2066 that is extending upward. The projections are configured, like other cleats described above, to ensure proper seating of the transverse edge so that the standard correctly oriented vertically and at the correct height. Cleat 2068 is similar to cleat 2061. It has hook-like projections 2070 that clasp a horizontal rail and is clamped to the rail by tightening a screw (not shown) that is inserted through threaded screw hole 2072. Like projections 2066, projections 2074 are configured to cooperate with a transverse edge on a back of a vertical standard to retain the standard on the cleat when it is hung from the upward extending projection.

FIGS. 29A-D illustrate another example of a standard for mounting vertically on cleats, such as any of those disclosed above, and to which can be connected standard brackets for shelving and other storage components in a configurable storage system. Vertical standard 2100 has an elongated central axis, which is parallel to x-axis 2102 of the three-dimensional reference frame 2104, with a comparatively narrow width, as measured along the y-axis 2106 and depth as measured along the z-axis 2108. The front of the standard, shown in FIG. 29A, comprises one or more rows vertical row of slots 2010 located at predetermined intervals along the length of the vertical standard. The interval is preferably the same between slots and is, in one example, 64 mm on center, with the slots 26 mm in length.

The standard has a front wall 2112, sidewalls 2114 and 2116, and a partial back wall formed by back wall segments 2118a and 2118B with an opening 2118C between them. Formed on the front of the vertical standard on opposite side of the vertical column of slots 2110 are raised portions 2120a and 2120b that extend the length of the vertical standard. The raised portions partially obscure the slots 2110 while also leaving an opening or groove 2121 that extends the length of the standard, through brackets can be inserted between the raised portions, with connecting portions of the bracket extending into the slots. The raised portions also have a sloping inside surfaces 2123. In the illustrated embodiment the standard is made from a single sheet of metal that is cut, punched, and folded into the final shape that is shown.

A portion of each backwall segment 2118a and 2118b is, in effect, cut to create an enlarged opening 2122 for accommodating a cleat, such as the cleat 2024. Each enlarged opening also defines at least one mounting point comprised of two transverse edges 2124 at one end of the enlarged opening, which are also the edges of the back well segments that define the enlarged opening. There is one transverse edge on each side of the opening. This example includes mounting points at each end to allow the vertical standard to be oriented vertically in either direction. The enlarged openings 2122 are regularly spaced along the back of a vertical standard. There are preferably at least two such enlarged openings on a back of the vertical standard. Each of the enlarged openings 2122 are centered on one of the slots 2110, or alternatively have a fixed special relationship with a slot, such that each of transverse edges 2126 also have a predetermined spatial relationship with the slot. The transverse edges are, in the illustrated example, perpendicular to the central axis of the vertical standard. However, in alternative embodiments a transverse edge could be angled relative respect to the central axis of the vertical standard. For example, in an embodiment with two transverse edges, the angles of the transverse could be mirrored with respect to the central axis to bias the vertical standard toward a central position relative to the cleat.

Figure 30A:
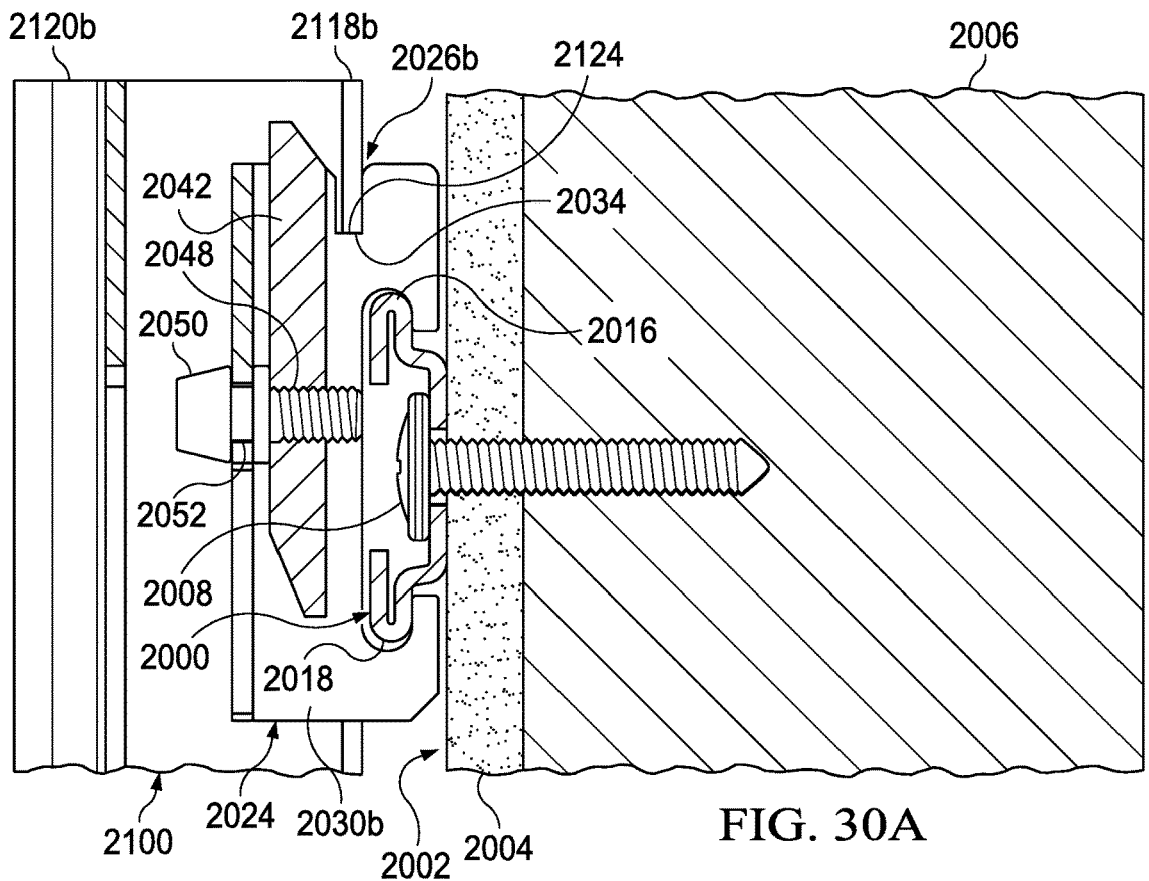
FIG. 30A is a cross-section of the vertical standard of FIGS. 29A-D when hung from the cleat mounted on the horizontal rail as shown in FIG. 26A, with the clamp that is part of the cleat in a retracted position.
Figure 30B:
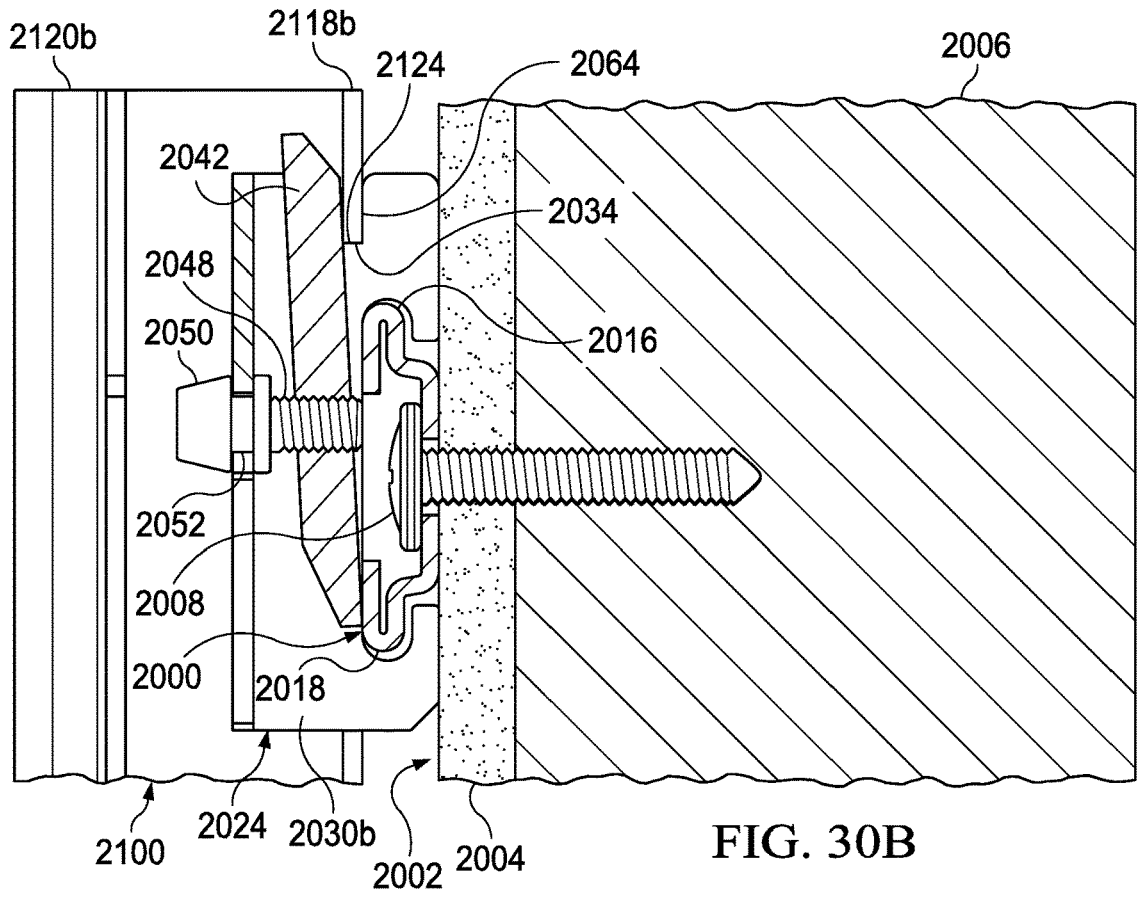
FIG. 30B is the same view as FIG. 30A with the clamp in an extended position.

Referring now also to FIGS. 30A-30B, a vertical standard 2100 is hung on a cleat 2024 by placing one of the enlarged openings 2122 of the vertical standard 2100 over the cleat and then lowering the transverse edges 2126 on backwall segments 2118a and 2118b into slots 2026a and 2026b, respectively. The transverse edges 2124 rest against the bottom surfaces 2034 of the slots 2026a and 2026b, which hold the vertical standard on the cleat. When the plate 2042 is moved from the retracted position shown in FIG. 30A to an extended position shown in FIG. 30B, pressure is applied to both the backwall segments 2118a and 2118, forcing them against a back surface 2064 of each of the slots 2026a and 2026b, respectively, thus clamping them to the cleat. At the same time, the plate pivots and a lower portion of it presses against the horizontal rail 2000 to clamp the cleat to the horizontal rail. The plate able to both translate and pivot because there is sufficient play in the swivel that couples the screw to the body 2028 to allow the screw stem to be angled with respect to the front wall 2032 of the body.

FIGS. 31A-E illustrate fastening of a plurality of standards 2100 to a plurality of horizontal rails 2000 that have been attached to a wall 2002. FIG. 31A illustrated cleats 2024 being attached to the rails in two columns, with three cleats being used to support each vertical standard. FIG. 31B shows one of the vertical standards 2100 have been hung and another being positioned to be hung on three cleats 2024 arrange in a column. FIG. 30C shows both vertical standards 2100 being attached to the three horizontal rails 2000. The standards cover the cleats, the cleats fitting between the side walls of the standards.

Figure 31D:
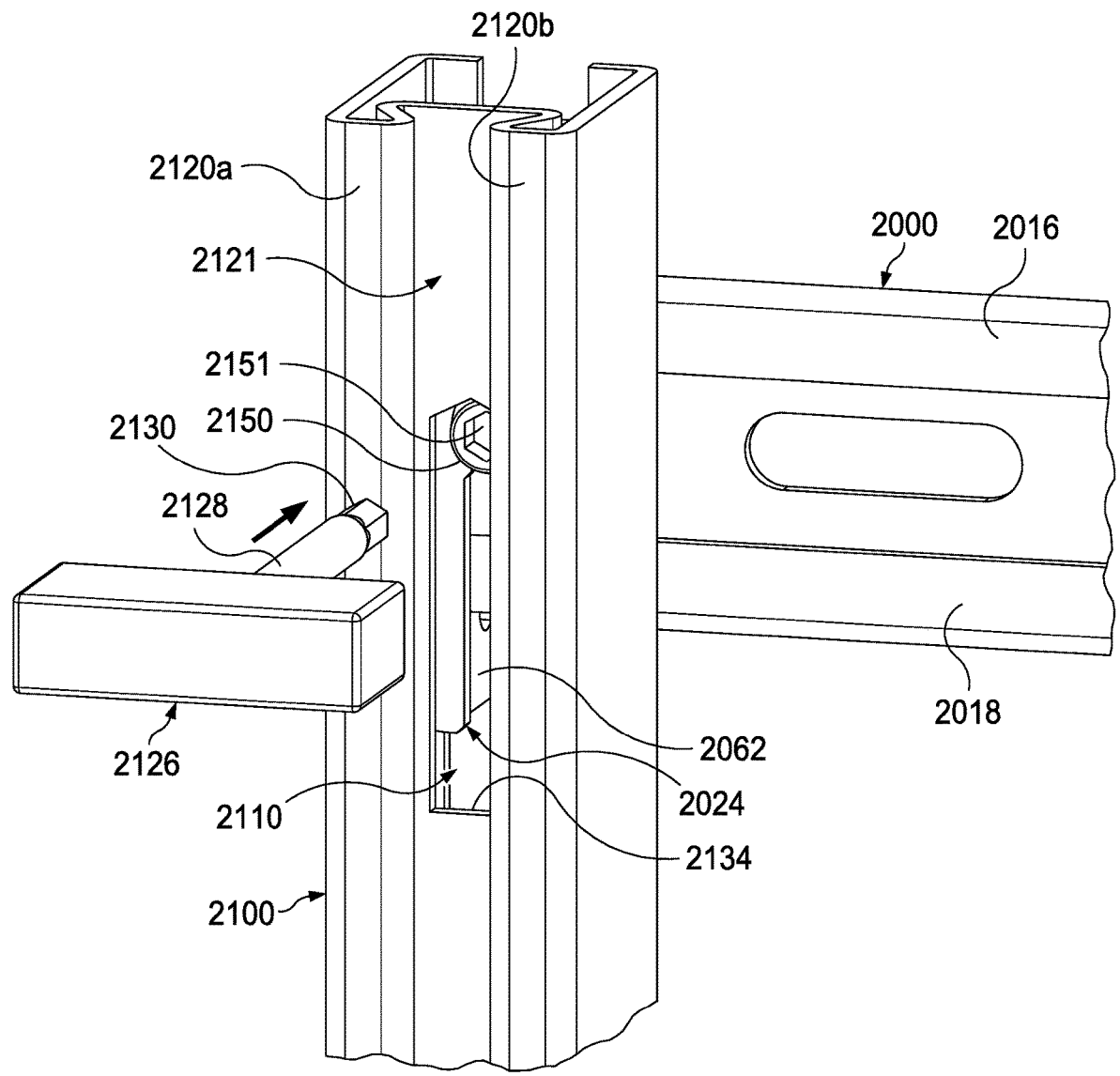
Figure 31E:
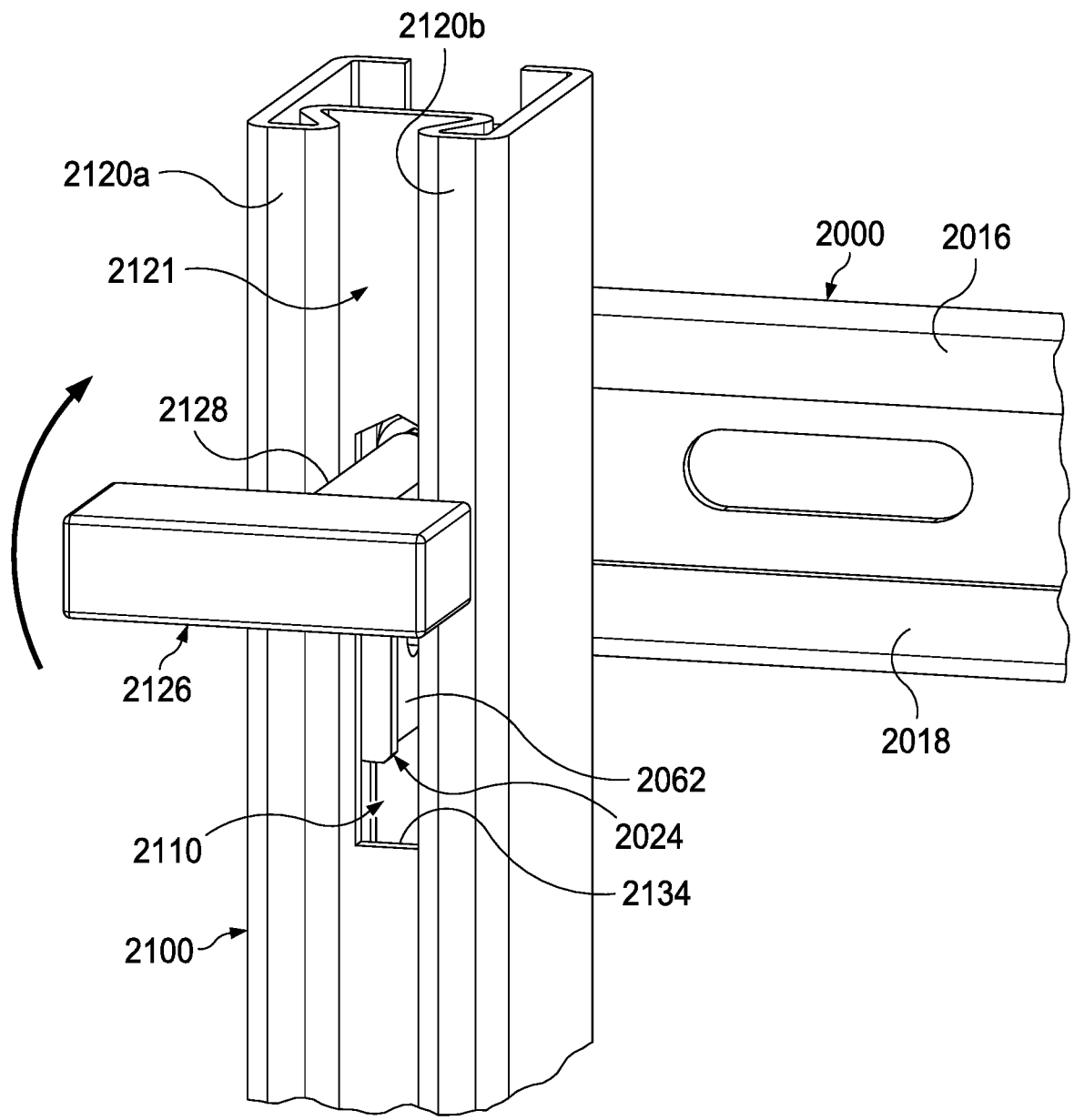
Figure 32:
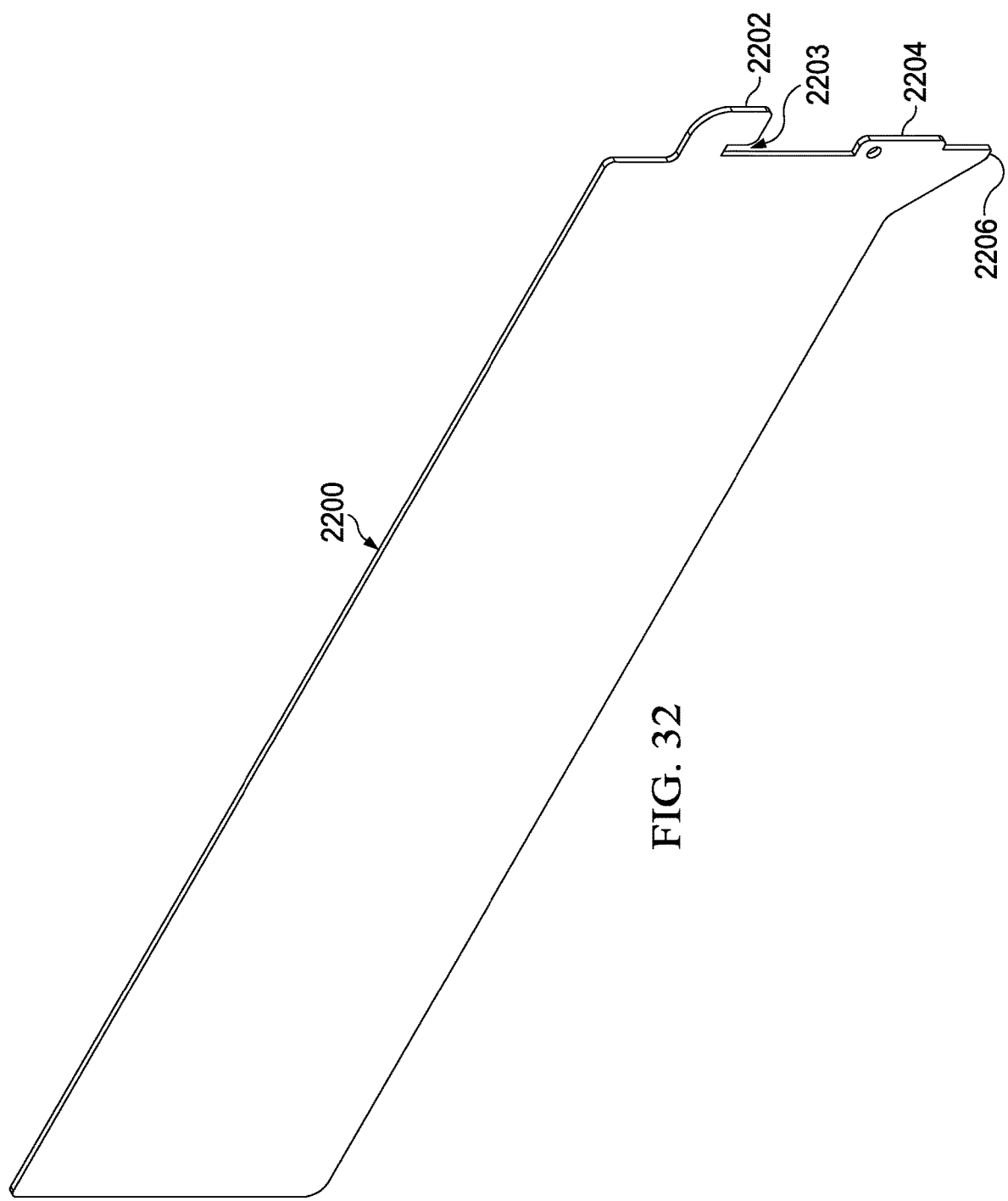
FIG. 32 is a perspective, rear view of a cantilevered bracket.

FIGS. 31D and 31E show the insertion of a shaft of a 2128 of a tool 2127 through the groove 2121 between the raised portions 2120a and 2120b, and then also through the slot 2110, to turn the screw head 2050 of one of the cleats 2024 on which the standard has been hung. The slots for handing brackets from the standard are large enough to accommodate insertion of a tool for tightening the clamp in the cleat. The tool has, in this example, a hexagonally-shaped head 2130 that fits into the hexagonal socket 2151 formed on the screw head. Turning the screw head clamps the vertical standard to the cleat and the cleat the horizontal rail 200o at the same time, in a single operation. The screw head is visible through slot 2110 and groove 2121 to a person installing the standard. The screw head is also located to one end of the slot (the upper end) to leave room below the screw to accommodate a connecting portion of bracket inserted into the slot. The relative position of the slot and the transverse edges forming the mounting points on the back of the standard, and the relative positions of the recess in the cleat in which the transverse edges are received (slots 2026a and b, for example, shown in FIGS. 26A-B) and the location of the clamping device (the screw, in this example), are fixed and known, and in this example are fixed to always result in the screw head at one of the slot 2110 so that it seen and accessed through a slot in the standard but not interfere with use of the slot for connecting a bracket to the standard. The fixed relative positions of these elements also allow for an opening 2062 formed in the front wall 2032 of the cleat to align with the slot 2010 to allow insertion of a connecting portion of bracket without interference from the cleat 2024.

Figure 33:
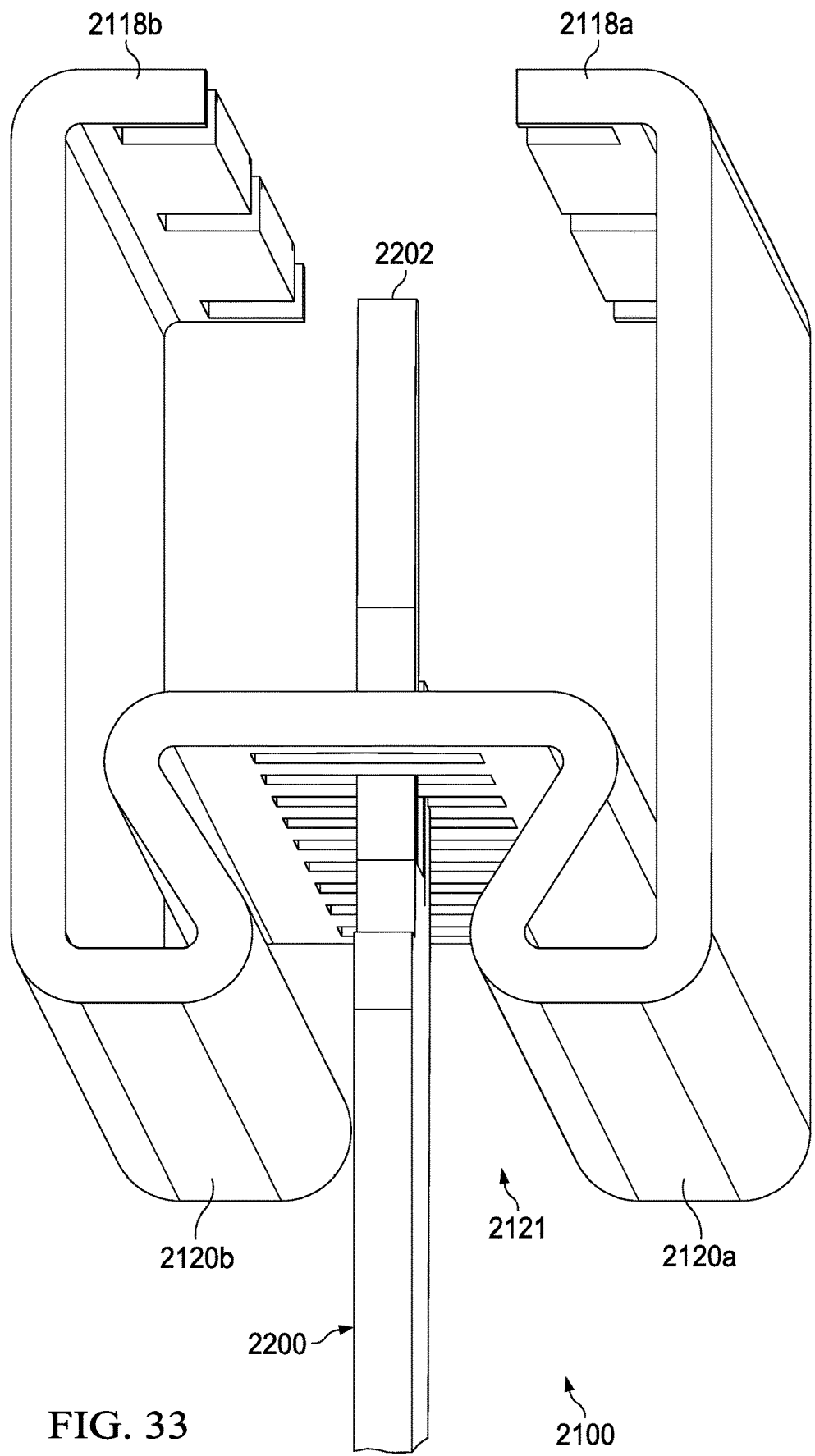
Figure 34A:
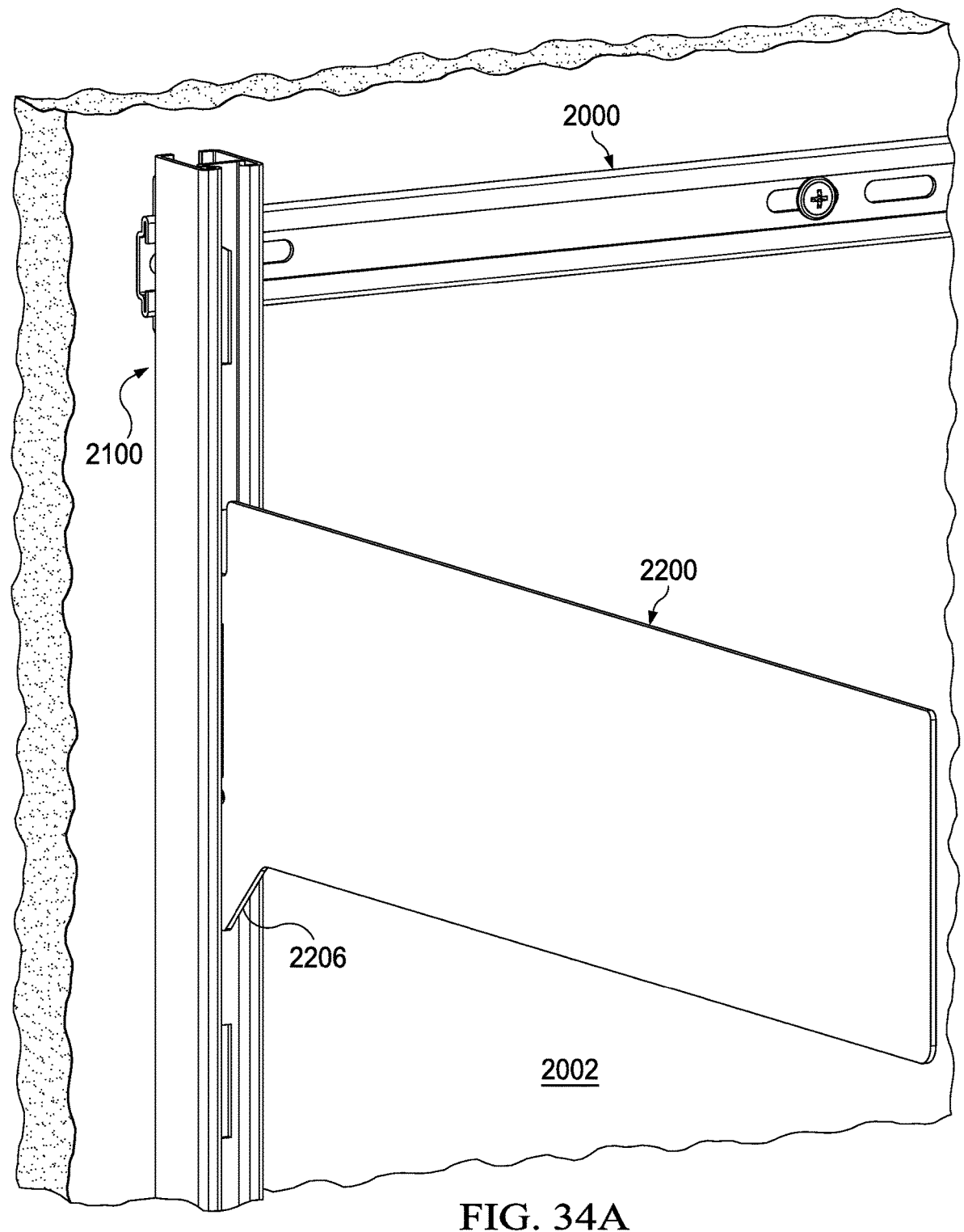
FIG. 34A is a view side, perspective view of an installation of a storage system on a wall with the bracket of FIG. 32 mounted to a vertical standard shown in FIG. 29 hanging from a cleat retained on a horizontal rail, illustrating extensions on the front of the standard to visually obscure the connections slots for the cantilevered brackets.
Figure 34B:
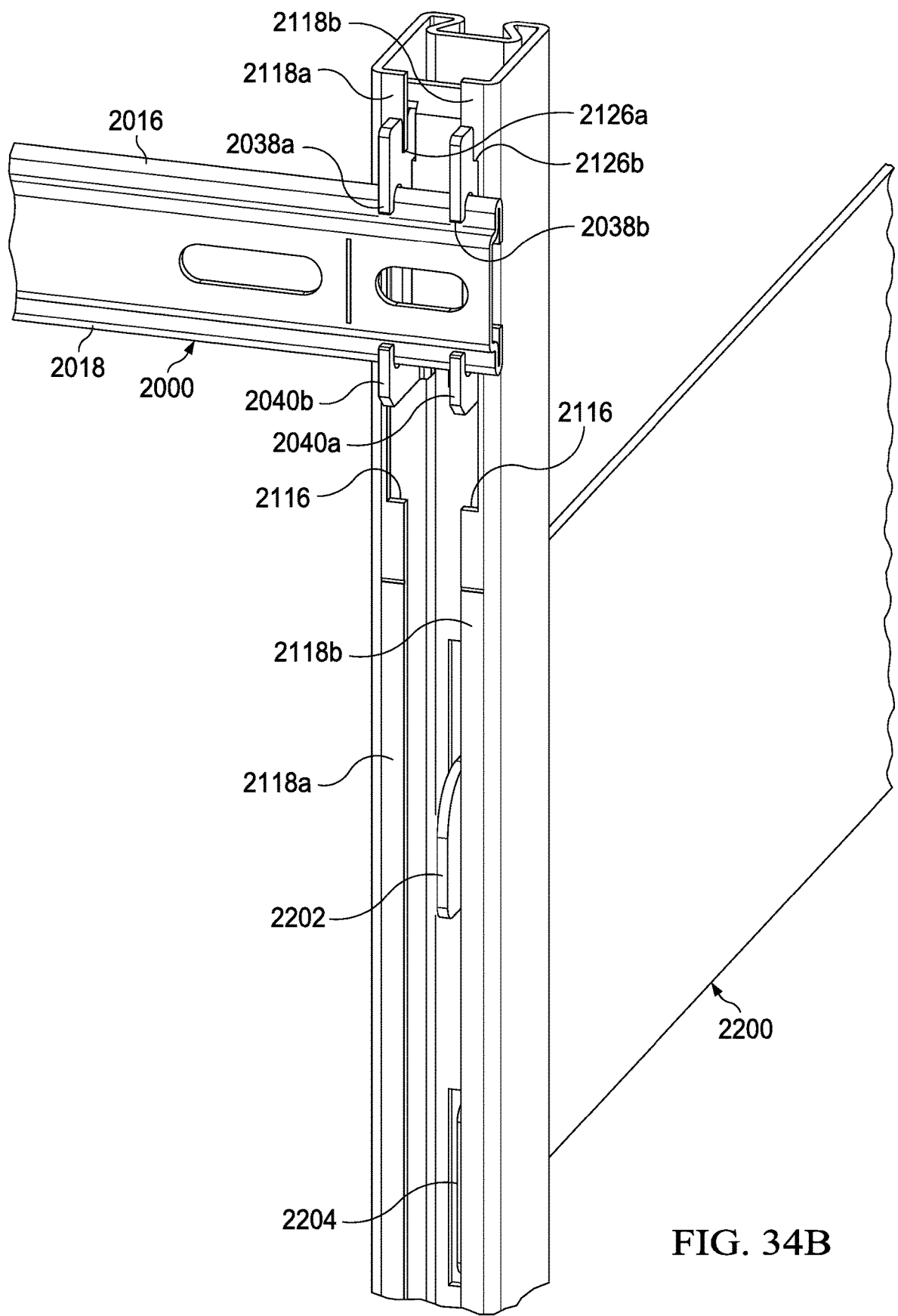
FIG. 34B is a rear view from of the installation of FIG. 34A with the wall removed.
Figure 34C:
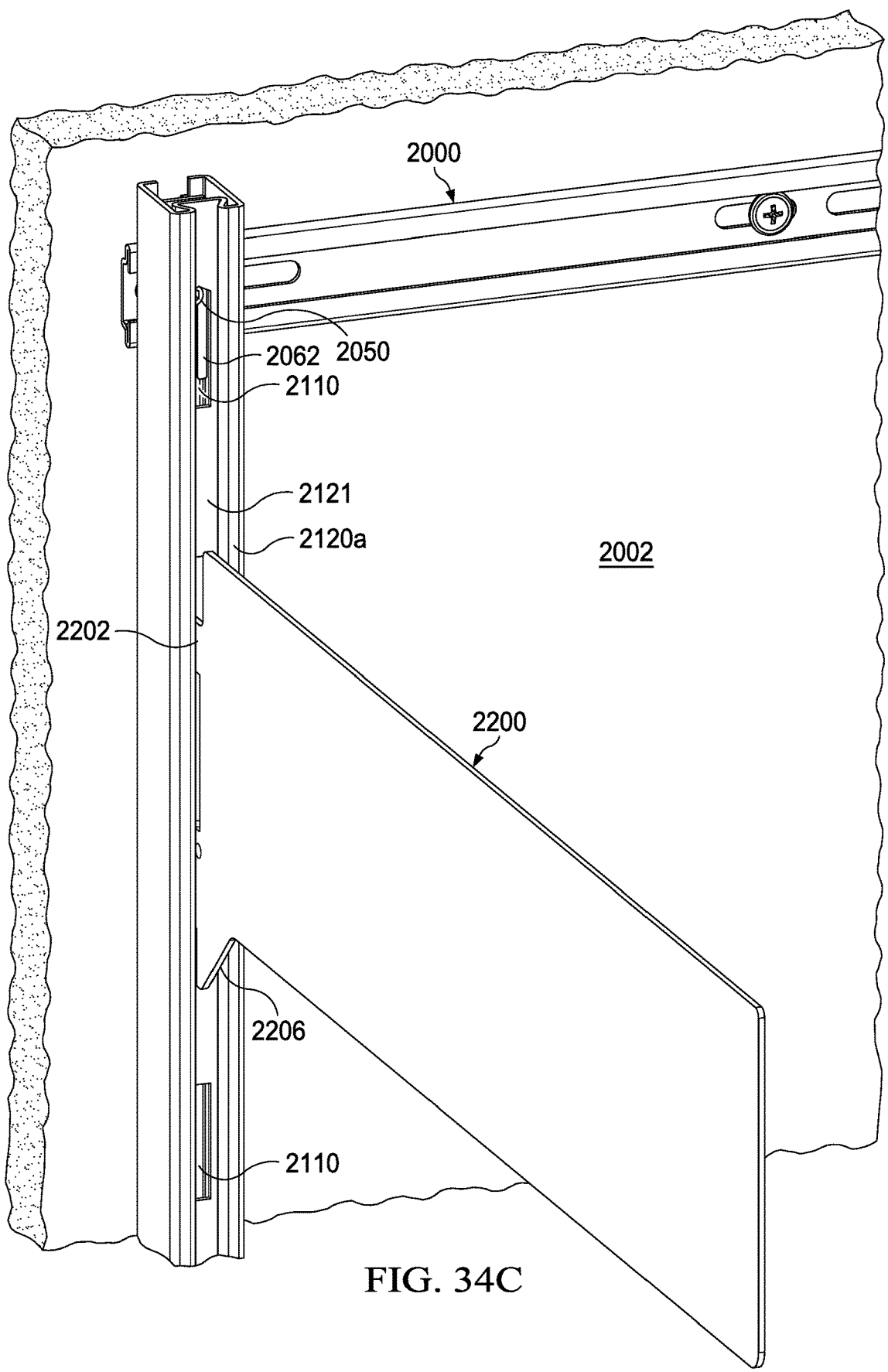
FIG. 34C is a side view from the front of the installation of FIG. 34A, taken from a different perspective to show the relationship of the cleat to the slots in the vertical standard.

Referring now to FIGS. 32, 33, and 34A-C, bracket 2200 is a representative example of a cantilevered bracket that can be attached to standard 2100. One end of the bracket is formed a connection interface with single row of connecting portions 2202 and 2204 that are integrally formed with bracket. Connecting portion 2202 has a slot 2203 formed in it to form a hook-like shape that closely fits a bottom edge 2132 of a slot 2110 of vertical standard. Connection portion 2204 comprises a tab that is inserted in next lower slot of a standard to prevent twisting and to ensure alignment with the vertical standard of the extension 2206 that lengthens the end of the bracket that connects to the standard to improve load distribution. Brackets carrying heavier loads can be made with a longer interface fitting, for example, over three or more slots and including two hook-look connecting portions 2204. This particular example of a bracket has a constant height along the portion of it that extends beyond the raised portions 2120a and 2120b of the standard 2100. It also has the thickness of a single piece of metal but could be made to have a double thickness. Furthermore, as can be seen in FIG. 33, the width of the slots 2110 and groove 2121 in the standard 2100 in this example is large enough to accommodate at least two brackets side by side.

Unless otherwise expressly stated, the foregoing description of exemplary and preferred embodiments, and accompanying drawings, are intended to be representative, non-limiting examples of the invention that is claimed, and may describe multiple inventions in addition to the one set forth in the claims. The invention, as defined by the appended claims, is therefore not intended to be limited to the details of the described examples and embodiments, to any of any preferred embodiment. Furthermore, the subject matter of a claim is not intended to be limited by statements made in reference to aspects of any the embodiments or examples other than those particular aspects that are expressly set forth in a claim. Rather, the invention, as claimed, is intended to encompass equivalents of the examples and embodiments, as well as alterations and modifications to them that come within the ordinary and customary meaning of the claim terms, unless such terms have been expressly defined in this specification or otherwise subject to construction, such as under 35 U.S.C. § 112(f), that are required by statute.

What is claimed is:

1. For a wall-mounted storage system of a type using vertical standards that have a front in which is formed a plurality of slots arranged along its length for connecting cantilevered brackets to the standard and a plurality of mounting points located rearward of the front of the standard at fixed, predetermined intervals along the length of the of the standard, a cleat for hanging the vertical standard from a wall comprising:
   first retaining portion on a front side of the cleat, the first retaining portion configured for cooperating with any one of the plurality of mounting points to capture and retain it;
   a second retaining portion on a back side of the cleat, the second retaining portion configured to cooperate with a horizontal rail mounted to the wall to retain the cleat on the rail; and
   a clamp displaceable with respect to the first retaining portion, wherein the clamp, when tightened, is configured to press a mounting point to the cleat when captured by the first retaining portion.

2. The cleat of claim 1, wherein the claim, when the clamp is tightened, is configured for pressing against a mounting point and a horizontal rail at the same time when captured by the first and second retaining portions.

3. The cleat of claim 1, wherein the clamp is tightened by turning a screw that displaces a plate to push, when a horizontal rail is captured by the second retaining portion, push against the horizontal rail and pull the second retaining portion against the horizontal rail.

4. For a wall-mounted storage system of a type using vertical standards that have a front in which is formed a plurality of slots arranged along its length for connecting cantilevered brackets to the standard and a plurality of mounting points located rearward of the front of the standard at fixed, predetermined intervals along the length of the of the standard, a cleat for hanging the vertical standard from a wall comprising:
- first retaining portion on a front side of the cleat, the first retaining portion configured for cooperating with any one of the plurality of mounting points to capture and retain it; and
- a second retaining portion on a back side of the cleat, the second retaining portion configured to cooperate with a horizontal rail mounted to the wall to retain the cleat on the rail;
- wherein the first retaining portion comprises a recess configured to interfere with a transverse edge of one of the plurality of mounting points of the vertical when it is inserted into the recess.

5. For a wall-mounted storage system of a type using vertical standards that have a front in which is formed a plurality of slots arranged along its length for connecting cantilevered brackets to the standard and a plurality of mounting points located rearward of the front of the standard at fixed, predetermined intervals along the length of the of the standard, a cleat for hanging the vertical standard from a wall comprising:
- first retaining portion on a front side of the cleat, the first retaining portion configured for cooperating with any one of the plurality of mounting points to capture and retain it; and
- a second retaining portion on a back side of the cleat, the second retaining portion configured to cooperate with a horizontal rail mounted to the wall to retain the cleat on the rail;
- wherein the second retaining portion comprises at least one hook-like member for extending around a top edge on the horizontal rail.

6. The cleat of claim 5, wherein the second retaining portion further comprises a second hook-like member for extending around a bottom edge of the horizontal rail.

7. A wall-mounted storage system, comprising:
- a plurality of standards for mounting in a vertical orientation on a vertical surface, each of the plurality of standards having a back and a front in which is formed a plurality of slots arranged along its length for connecting cantilevered brackets to the standard; each of the plurality of standards further comprising a plurality of mounting points located rearward of the front of the standard at fixed, predetermined intervals along the length of the of the standard, each mounting point comprising a transverse edge;
- a plurality of horizontal rails; and
- a plurality of cleats for mounting any one or more of the plurality of standards to a vertical wall, each of the plurality of cleats having a predetermined width narrower than of each of the plurality of standards; each of the plurality of cleats having a first retaining portion for cooperating with the transverse edge of a corresponding one of the plurality of mounting points on one of the plurality of standards when the standard is placed over the cleat, each of the plurality of standards having at least an opening next to the mounting point large enough to receive a cleat, wherein each of the plurality of cleats further comprises a second retaining portion have a cross-sectional shape for enabling it to cooperate with any one of the horizontal rails to retain the cleat on the horizontal rail.

8. The wall-mounted storage system of claim 7, wherein each of the plurality of mounting points of at least one of the plurality of standards comprises at least one tab that a least partially extends across the back of the standard, and wherein the at least one tab is comprised of the transverse edge.

9. The wall-mounted storage system of claim 7, wherein each of the plurality of mounting points on at least one of the plurality of standards comprises at least one pin extending at least part way across the back of the standard, and wherein the at least one pin is comprised of the transverse edge.

10. The wall-mounted storage system of claim 7, wherein the back of each of the plurality of standards is further comprised of:
- a back wall extending at least part way across the back of the standard; and
- a plurality of openings located at each of the plurality of mounting points, which is defined at least partially by an edge of the back wall, each of the plurality of openings have a width greater than the width of each of the plurality of cleats; and
- wherein transverse edge for each of the plurality of mounting points is comprised of the edge of the back wall that at least partially defines the opening located at the mounting point.

11. The wall mounted storage system of claim 7, wherein each of the plurality of cleats comprises a clamp for fixing the cleat to any one of the plurality of horizontal rails when hung from the horizontal rail and tightened.

12. The wall mounted storage system of claim 11, wherein the clamp, when tightened, presses against any one of the plurality of mounting points on a vertical standard when the transverse edge of the mounting point of the mounting point is captured by the first retaining portion.

13. A method of installing a wall-mounted storage system, comprising:
- attaching a plurality of horizontal rails to the walls;
- arranging a plurality of cleats in vertical columns and horizontal rows on wall by connecting each of the plurality of cleats to one of the plurality of horizontal rails, with each of the vertical columns defined by at least two of the plurality of cleats and each of the horizontal rows defined by at least two of the plurality of cleats; and
- hanging at least two vertical standards on the plurality of cleats, one of the at least two vertical standards being hung on at least two of the plurality of the at least two of the plurality of cleats defining one of the two vertical columns and the other of the at least two vertical standards being hung on at least two of the at least two of the plurality of the defining the other of the at least two vertical columns;
- wherein, each of the plurality of standards has a back and a front in which is formed a plurality of slots arranged along its length for connecting cantilevered brackets to the standard, each of the plurality of standards further comprising a plurality of mounting points located rearward of the front of the standard at fixed, predetermined intervals along the length of the of the standard, each mounting point comprising a transverse edge, and at least an opening next to each mounting point large enough to receive any one of the plurality of cleats .

14. The method of claim 13, wherein, each of the plurality of cleats has a predetermined width narrower than of each of the at least two vertical standards.

15. The method of claim 13, wherein each of the plurality of cleats is comprised of a first retaining portion configured for cooperating with any one of the plurality of mounting points to capture it and a second retaining portion configured for cooperation with any one of the plurality of horizontal rails.

16. The method of claim 15, wherein each of the plurality of cleats comprises a clamp, and the method further comprises tightening the clamp on each of the plurality of cleats against the one of the plurality of horizontal rails to fix the position of the cleat to the horizontal rail.

17. The method of claims 16, wherein the clamp is further configured to enable it, when tightened, also to press against any one of the plurality of mounting points of any one of the at least two vertical standards when received in the first portion.

18. The method of claim 16, wherein the clamp, when tightened, presses the one of the one of the plurality of mounting points against the cleat.

19. The method of claim 18, wherein the clamp is tightened by pressing the clamp against the one of the plurality of horizontal rails and pushing the cleat away from the horizontal rail to pull the second retaining portion away from the wall and against the horizontal rail.

20. The method of claim 19, wherein each of the plurality of horizontal rails comprises a top edge offset from the wall, and wherein the second retaining portion of each of the plurality of cleats comprises at least one hook-like member extending around the top edge, the top edge having a back surface against which the at least one hook-like member is capable of being pulled against when the clamp is tightened.

21. The method of claim 20, wherein each of the plurality or horizontal rails further comprises a bottom edge offset from the wall, and wherein the second retaining portion further comprises at least a second hook-like member extending from the bottom edge.

22. The method of claim 15, wherein the first retaining portion comprises a slot for receiving the one of the plurality of mounting points, the slot forming an interfering surface for cooperating with the transverse edge.

23. The method of claim 13, wherein each of the plurality of mounting points of at least one of the plurality of vertical standards comprises at least one tab that a least partially extends across the back of the standard, and wherein the at least one tab is comprised of the transverse edge.

24. The method of claim 13, wherein each of the plurality of mounting points one at least one of the plurality of standards comprises at least one pin extending at least part way across the back of the standard, and wherein the at least one pin is comprised of the transverse edge.

25. The method of claim 13,
wherein the back of each of the plurality of standards is further comprised of:
a back wall extending the length of standard and at least part way across the back; and
a plurality of openings located each of the plurality of mounting points, which is defined at least partially by an edge of the back wall, each of the plurality of openings have a width greater than the width of each of the plurality of cleats; and
wherein transverse edge for each of the plurality of mounting points is comprised of the edge of the back wall that at least partially defines the opening located at the mounting point.

* * * * *